WITNESSES:
Bernard R. Gegauf
James F. Young

INVENTOR
Raymond Thompson
BY
Donald R. Lackey
ATTORNEY

Sept. 22, 1970 R. THOMPSON 3,530,369
REGULATOR APPARATUS INCLUDING STATIC SWITCHING
CIRCUIT HAVING MID-TAPPED INDUCTOR
Original Filed March 23, 1967 9 Sheets-Sheet 4

Sept. 22, 1970 R. THOMPSON 3,530,369

REGULATOR APPARATUS INCLUDING STATIC SWITCHING CIRCUIT HAVING MID-TAPPED INDUCTOR

Original Filed March 23, 1967 9 Sheets-Sheet 6

United States Patent Office 3,530,369
Patented Sept. 22, 1970

3,530,369

REGULATOR APPARATUS INCLUDING STATIC SWITCHING CIRCUIT HAVING MID-TAPPED INDUCTOR

Raymond Thompson, Redcar, Teesside, England, assignor to Westinghouse Electric Corporation, Pittsburgh, Pa., a corporation of Pennsylvania Original application Mar. 23, 1967, Ser. No. 625,447. Divided and this application May 9, 1969, Ser. No. 823,364
Int. Cl. H02m 5/12; H02p 13/06
U.S. Cl. 323—22 16 Claims

ABSTRACT OF THE DISCLOSURE

Regulator apparatus having a static switching circuit connected between a source of alternating potential and a load circuit. The static switching circuit includes controllable static switching devices and a mid-tapped inductor. A firing circuit is provided which switches static switching devices in the static switching circuit to regulate the voltage across the load circuit, and to maintain a circulating current flowing between the ends of the mid-tapped inductor above one-half the magnitude of the current flowing in the mid-tap.

CROSS REFERENCE TO RELATED APPLICATIONS

This application is a division of application Ser. No. 625,447, filed Mar. 23, 1967. Certain of the apparatus disclosed but not claimed in this application is disclosed and claimed in copending application Ser. No. 625,396, filed Mar. 23, 1967, now U.S. Pat. 3,444,457, which is assigned to the same assignee as the present application.

BACKGROUND OF THE INVENTION

Field of the invention

The invention relates in general to regulator apparatus, and more specifically to voltage regulator apparatus of the solid state type for alternating current electrical systems.

Description of the prior art

In alternating current voltage regulators of the prior art, of the type having solid state switching devices, such as disclosed in U.S. Pat. 3,040,239, which is assigned to the same assignee as the present application, the firing sequence of the solid state switching devices, and the firing angle over which the devices may be switched, must take into consideration the power factor of the load. Therefore, when the load is of the type where the power factor may change, the firing control may become rather complex, and if the regulator is for a system of relatively low power, the firing control may become a large percentage of the total system cost.

The hereinbefore mentioned copending patent application discloses and claims a static switching circuit for a regulator which may be switched without regard to the power factor of the load. However, in addition to regulating the voltage across the load, the control circuit must control the magnitude of a current circulating in a mid-tapped inductor used with the switching arrangement. Thus, it would be desirable to provide a new and improved regulating system which uses the static switching arrangement of the hereinbefore mentioned copending patent application, with firing control which will switch the devices of the static switching arrangement to regulate the load voltage, and control the circulating current in the mid-tapped inductor.

Further, the form factor of the output voltage is changed when using the switching arrangement of the hereinbefore mentioned copending patent application, and it would thus be desirable to provide a regulator system which will regulate the RMS output voltage, even though the voltage form factor changes.

Finally, it would be desirable to utilize the switching arrangement of the hereinbefore mentioned copending application in three-phase arrangements, which eliminate certain apparatus which would normally be used when applying prior art techniques to adapt the switching arrangement to polyphase systems.

SUMMARY OF THE INVENTION

Briefly, the present invention is new and improved regulator apparatus which utilizes the static switching of the hereinbefore mentioned copending application, along with a firing circuit which regulates the load voltage and circulating current in the tapped inductor of the switching arrangement. The firing circuit utilizes a differential amplifier, with each output of the differential amplifier controlling the position of a switching pulse. A signal responsive to one of the parameters to be regulated is applied to the normal input of the differential amplifier, and a signal responsive to the other parameter to be regulated or controlled is applied to the differential amplifier as a common mode signal.

The disclosed invention regulates the RMS output voltage by detecting the mean voltage, even though the form factor of the output voltage changes, by reducing the loop gain of the regulator system to the point where the curve of the mean output voltage over the regulated range has the same slope as the voltage form factor curve over this range, but of opposite sign.

BRIEF DESCRIPTION OF THE DRAWINGS

Further advantages and uses of the invention will become more apparent when considered in view of the following detailed description and drawings, in which.

DESCRIPTION OF THE PREFERRED EMBODIMENTS

Figure 1:
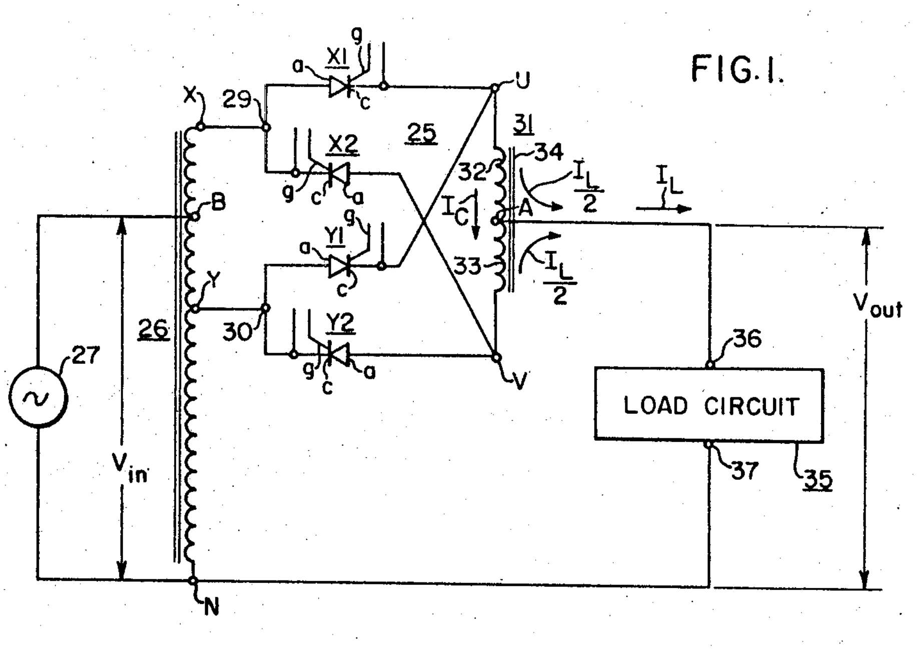
FIGS. 1 and 2 are schematic diagrams illustrating regulator switching arrangements which may be used with the disclosed regulator apparatus.
Figure 2:
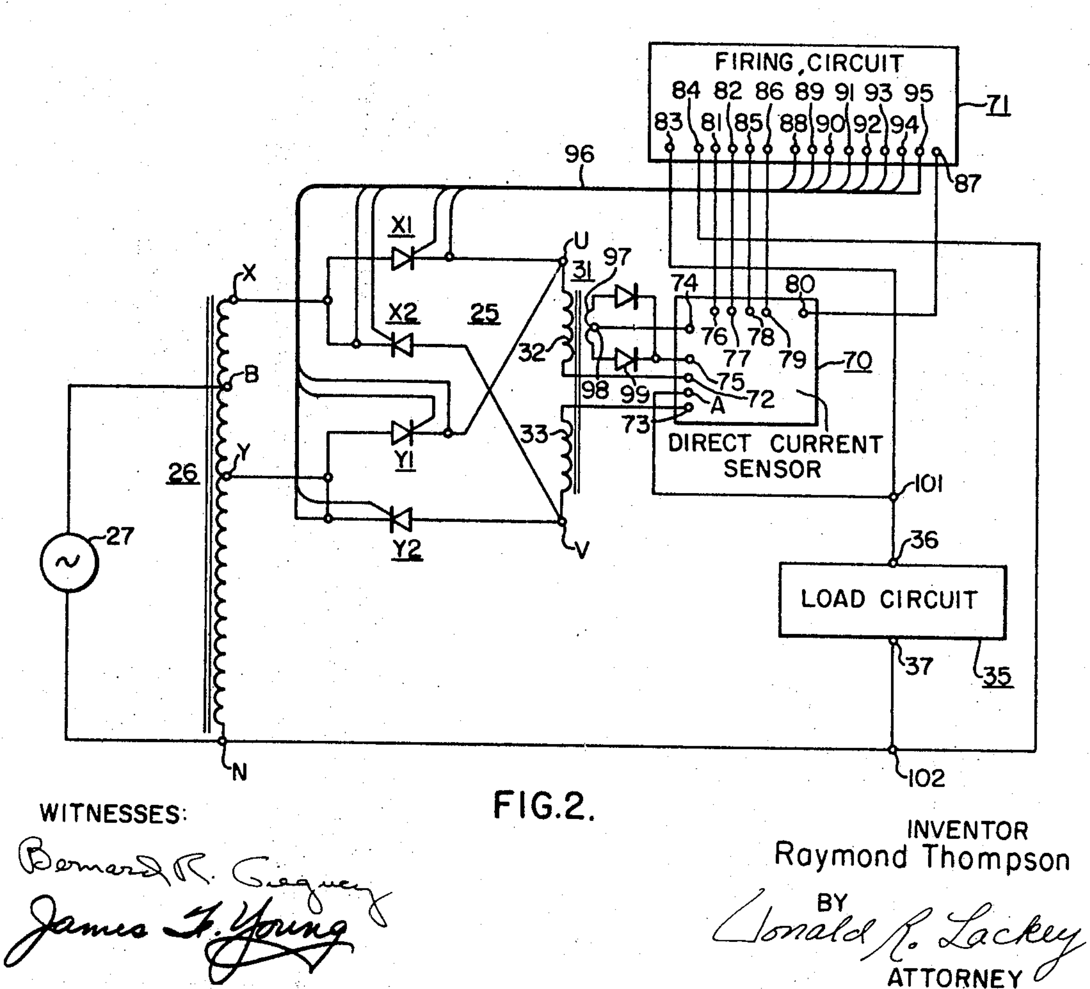

Referring now to the drawings, and FIG. 1 in particular, there is shown a schematic diagram of the basic regulator switching arrangement, constructed according to the teachings of the hereinbefore mentioned copending application, shown without the associated firing means and direct current sensor. FIG. 2 is a schematic diagram of the basic regulator arrangement of FIG. 1, including a block diagram of a firing circuit and a direct current sensor arrangement constructed according to the teachings of the invention.

More specifically, FIG. 1 illustrates a basic regulator switching arrangement 25. For purposes of example, switching arrangement 25 is shown connected to taps X and Y on a single-phase autotransformer 26, but it may be used in a plurality of different electrical arrangements, such as with transformers of the isolated winding type, and in either single or polyphase systems. Transformer 26 has terminals B and N connected to a source 27 of alternating potential. If it is desirable to be able to buck and boost the source potential, terminal B may be located between terminals Y and X. If it is desirable to only boost the source potential, terminal B may be moved down to coincide with terminal Y, and if it is desirable to only buck the source potential, terminal B may be moved up to coincide with terminal X.

Regulator switching arrangement 25 includes first and second input terminals 29 and 30, solid state switching devices X1 and X2, associated with input terminal 29, solid state switching devices Y1 and Y2 associated with input terminal 30, inductive means 31 having two winding portions 32 and 33 disposed on a magnetic core 34, which have one end connected in common at terminal A and ends U and V, respectively. Solid state switching devices X1, X2, Y1 and Y2 may be of any suitable type, such as semiconductor silicon controlled rectifiers, each having anode, cathode and gate electrodes *a*, *c* and *g*, respectively. The anode and cathode electrodes of switching devices X1 and X2, respectively, are connected to input terminal 29, and the anode and cathode electrodes of switching devices Y1 and Y2, respectively, are connected to input terminal 30. However, instead of connecting the remaining electrodes of devices X1, X2, Y1 and Y2, in common, according to certain teachings of the prior art, switching devices X1 and Y2 have their cathode and anode electrodes connected to terminals U and V, respectively, of inductive means 31, and switching devices Y1 and Y2 have their cathode and anode electrodes connected to terminals U and V respectively, of inductive means 31. The center tap A of inductive means 31 is connected to one side of an alternating current load circuit 35 at terminal 36, and the remaining terminal 37 of load circuit 35 is connected to terminal N of transformer 26. The prior art arrangement hereinbefore referred to, allows switching in each voltage half cycle from the voltage at terminal Y to the voltage at terminal X of transformer 26. Further, in the prior art arrangement, the control for the switching means must sense the type of load and power factor, and adjust the allowable firing angle range accordingly, to prevent shorting the winding between terminals X and Y. Regulator switching arrangement 25 overcomes these disadvantages of the prior art, by connecting two switching devices associated with each input terminal, across the ends or terminals U and V of inductive means 31. Inductive means 31 may be a center-tapped reactor, a center-tapped autotransformer, or two separate windings 32 and 33 wound on a common magnetic core 34, and having one of their ends connected in common, such that the impedance of the inductive means to the flow of alternating load current will be negligible. In other words, the total load current $I_L$ flowing through the load circuit 35 should divide equally through the two halves or sections of inductive means 31, with a load current equal to one half $I_L$ flowing in opposite directions in each winding portions 32 and 33. Inductive means 31 will support the voltage across taps X and Y when switching devices connected to taps X and Y are both conductive, thus making it unnecessary to determine the type of load and its power factor, and then using this information to place limits on the firing means associated with the switching devices. As will be hereinafter explained, steps are taken to prevent the current flowing in the conductive switching means from falling below their holding values.

Inductive means 31 also reduces the harmonic distortion in the output voltage by approximately 50%, compared to a two tap arrangement of the prior art, as the waveform provided by regulator switching circuit 25 is more symmetrical, having two steps per voltage half cycle, instead of one. A three tap switching arrangement using a total of six solid state switching devices would be required by the prior art arrangements to approach the same low harmonic distortion achieved by the basic switching arrangement 25 shown in FIG. 1.

Figure 3:
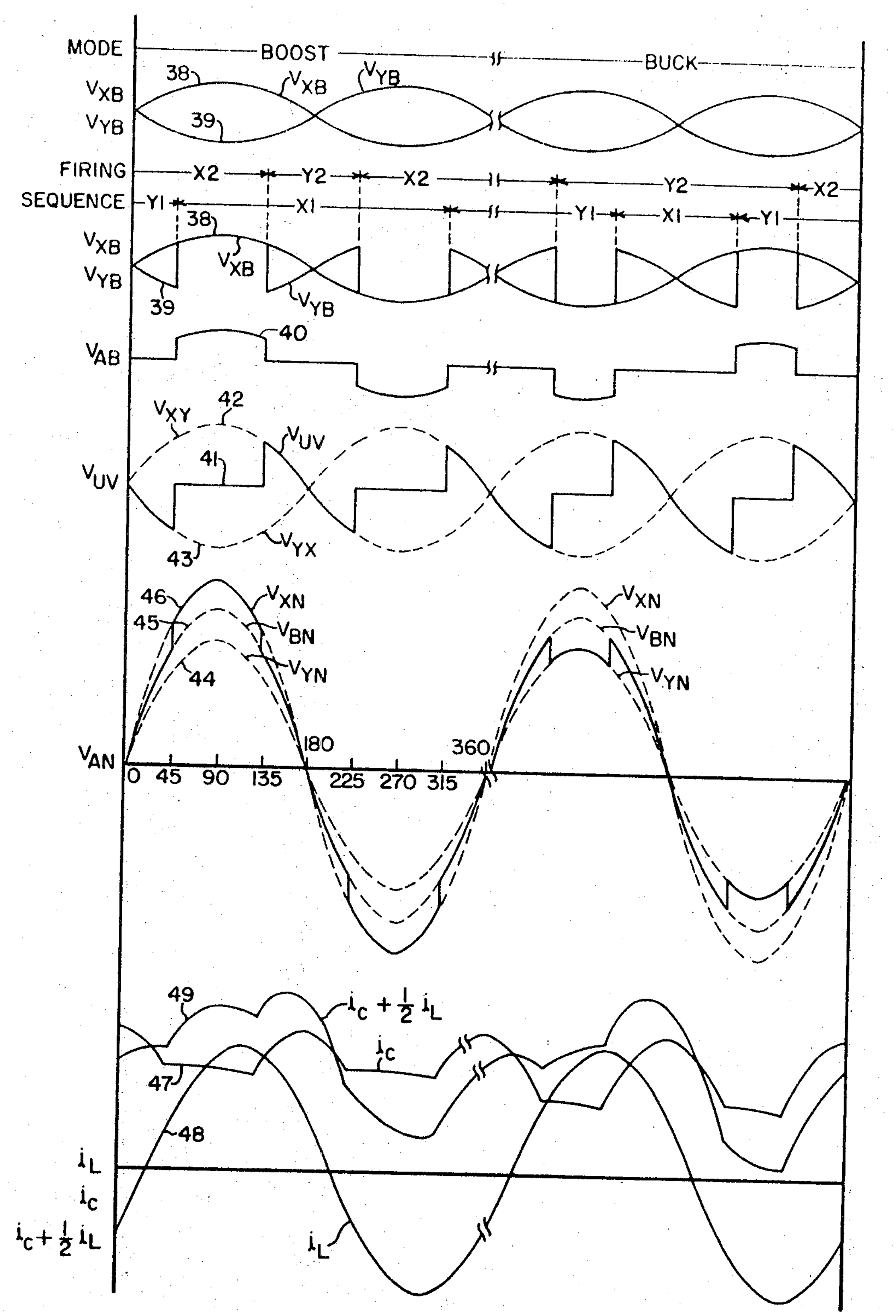
FIGS. 3, 4 and 5 are charts illustrating certain voltage and current waveforms, which aid in understanding the operation of the schematic diagram shown in FIG. 1.

In describing the operation of the basic regulator switching arrangement 25, the graphs shown in FIG. 3 will be referred to. Considering first the "boost" operating mode of the circuit, which occurs when the output voltage $V_{out}$ is less than the desired magnitude, on the positive half cycle of the supply potential voltages $V_{XB}$ and $V_{YB}$ are 180 degrees out of phase, as shown in waveforms 38 and 39, respectively. At the start of the positive half cycle of the supply voltage, switching devices Y1 and X2 are in their conductive conditions, as shown under the heading "Firing Sequence" in FIG. 3, which connects terminals X and Y to terminals V and U, respectively, which results in terminal A being at the potential midway between terminals X and Y. Then, at a predetermined point, determined by the firing means, device X1 is switched to its conductive condition, which reverse biases switching device Y1, turning it off, and only terminal X of transformer 26 is then connected to terminal A of inductive means 31. At another predetermined point in the positive voltage half cycle determined by the firing means, switching device Y2 is switched to its conductive condition, which reverse biases switching device X2, turning it off, thus connecting terminals X and Y to the center tap A via inductive means 31. Switching devices X1 and Y2 remain conductive to the end of the positive half cycle, and to a predetermined point on the negative half cycle, at which point X2 is switched to its conductive state, which turns off switching device Y2, and connects only terminal X to the center tap A. At a second predetermined point in the negative voltage half cycle, switching device Y1 is switched to its conductive state, which turns off device X1, and again connects both terminals X and Y to center tap A. The voltage $V_{AB}$ from terminal A to terminal B is thus developed, as shown in trace 40, from the resultant of the voltages $V_{XB}$ and $V_{YB}$. When both terminals X and Y are connected to the center tap terminal A via inductive means 31, voltages $V_{XB}$ and $V_{YB}$ cancel, making the voltage at terminals A and B equal to one another. When only terminal X is connected to center tap terminal A, the voltage from terminal A to terminal B is equal to the voltage $V_{XB}$. Thus, voltage $V_{AB}$ is equal to zero at the start and finish portions of each half cycle, and equal to the voltage $V_{XB}$ during the middle portion of each voltage half cycle.

The output voltage $V_{AN}$ thus follows the voltage $V_{BN}$ shown in curve 45, from zero until device X1 becomes conductive, at which point voltage $V_{AN}$ increases and follows voltage $V_{XN}$, shown in curve 46. When switching device Y2 becomes conductive, the voltage decreases and again follows voltage waveform $V_{BN}$ shown in curve 45.

In the "Buck" mode of the regulator, which occurs when the output voltage $V_{out}$ is greater than the desired value, voltage $V_{AB}$ is again determined by voltages $V_{XB}$ and $V_{YB}$, and in this instance the two voltages cancel except during the middle portion of the cycle, when voltage $V_{YB}$ is unopposed. Thus, voltage $V_{AB}$ has a similar waveform during both the buck and boost modes of operation, except they are 180 degrees out of phase. The output voltage $V_{AN}$ follows the voltage $V_{BN}$ curve 45, until device Y2 becomes conductive, at which point the voltage decreases and follows the voltage $V_{YN}$ curve 44, until switching device X1 becomes conductive, at which point voltage $V_{AN}$ increases and again follows the voltage $V_{BN}$ curve 45. Thus, in both the buck and boost modes of the regulator, the voltage output has a waveform at the start and finish of each voltage half cycle which is the same as voltage $V_{BN}$, which is the mean voltage of that which appears across terminals X–N and terminals Y–N. Then, over the control portion of each half cycle, which will usually be from 45 to 135° in the positive half cycle, and from 225° to 315° in the negative half cycle, the output voltage will be equal to $V_{XN}$ if the regulator is in the boost mode, and $V_{YN}$ if the regulator is in the buck mode. It will be noted that each voltage half cycle has two steps, which makes each half cycle more symmetrical about its midpoint than prior art switching arrangements.

Up to this point, the operation of the basic regulator circuit 25 has been described without regard to the current flowing in inductive means 31. There is a unidirectional circulating current $I_c$ flowing in inductive means 31 in the direction from terminal U to terminal V. The magnitude of the circulating current is determined by the voltage $V_{UV}$ across inductive means 31.

The voltage $V_{UV}$ across the inductive means 31 is developed from voltages $V_{XY}$ and $V_{YX}$. When devices Y1 and X2 are connected across inductive means 31, the voltage across inductive means 31 is equal to $V_{YX}$. When switching devices X1 and X2 are conductive, the voltage $V_{UV}$ across inductive means 31 is zero. When switching devices X1 and Y2 are conductive, the voltage $V_{UV}$ across inductive means 31 is equal to voltage $V_{XY}$.

As shown in FIG. 3, the voltage $V_{UV}$ across inductive means 31 has a similar wave shape and similar phase in both the boost and buck modes of the regulator. As shown in FIG. 3, curve 47, the instantaneous circulating current $i_c$ through inductive means 31, drops in magnitude during the first portion of each half cycle, it free-wheels during the middle portion of each half cycle, dropping slightly during this free-wheeling, and then increases during the last portion of each voltage half cycle. In order for the inductive means 31 to present substantially no impedance to the flow of alternating load current, the net instantaneous current in each of the windings 32 and 33 must be in the direction from terminal U to terminal V. Since the net instantaneous current is equal to the instantaneous circulating current $i_c$ plus the instantaneous load current in each winding section, which is equal to one half of $i_L$, since one half of the load current $i_L$ is opposite to the direction of the instantaneous current $i_c$, in winding portion 33, during one half cycle, and opposite to that of the circulating current in winding 32 during the other half cycle, it is essential that the circulating current $i_c$ be greater than one half of the current flowing in the center tap of the inductive means, which in this instance is one half of the load current $i_L$, for the maximum expected value of the current flowing in the center tap. Curve 48 in FIG. 3 illustrates the instantaneous line current $i_L$, and curve 49 illustrates the sum of the instantaneous circulating current $i_c$ and one half of the instantaneous load current $i_L$. It will be noted that the waveform 49, which is equal to $i_c + \frac{1}{2} i_L$ has the same general shape and phase each full voltage cycle, whether the regulator is in the buck or the boost mode. For purposes of example, the load current $i_L$ was chosen to lag the voltage $V_{AN}$ by 30 degrees. The current waveforms in the two winding portions 32 and 33 will be similar, but 180 degrees phase shifted.

In addition to maintaining the instantaneous circulating current $i_c$ greater than one half of the instantaneous current flowing in the center tap of the inductive means 31, for purposes of cancelling the impedance of the inductive means to the flow of the alternating current in the center tap, it is also necessary in order to keep the net current flow above the holding value of the various switching devices, in order to maintain the desired switching sequences of the switching devices.

The net instantaneous current flow in inductive means 31, from terminal U to terminal V, thus must be kept above the zero level at all times. The magnitude of the circulating current depends upon the average value of the voltage $V_{UV}$ shown in curve 41 in FIG. 3. The average voltage $V_{UV}$ may be controlled by controlling the firing angles of the two switching steps in each voltage half cycle, without affecting the desired output voltage. In fact, the firing angles of the two steps in each voltage half cycle may be simultaneously controlled to change both the output voltage and the average voltage across the inductive means, or each may be changed without substantially affecting the other. How this is accomplished is shown in the graphs of FIGS. 4 and 5.

Figure 4:
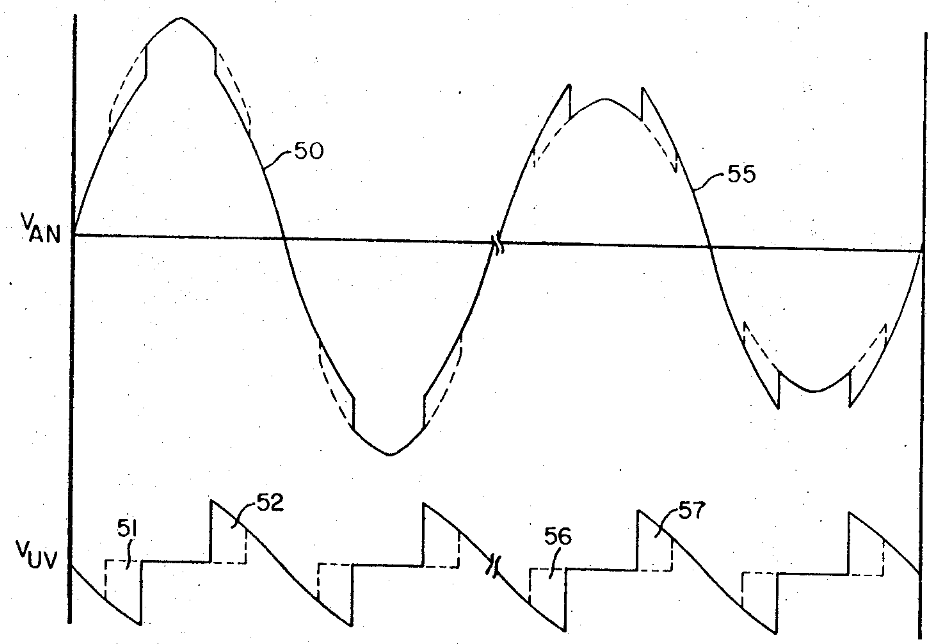

FIG. 4 illustrates the control of the output voltage $V_{AN}$, without affecting the average value of the voltage $V_{UV}$ across inductive means 31. In controlling the output voltage, in either the boost or buck modes, the firing points in each half cycle are moved toward one another, or away from one another. For example, consider the first cycle of the solid line curve 50 of the voltage $V_{AN}$, in FIG. 4, which is in the boost mode. To increase the output voltage to include the dotted line portions, the firing points are moved away from one another, with the first firing point being advanced, and the second firing point being retarded. The effect on voltage $V_{UV}$ is to increase the voltage by an amount shown at 51, and to decrease it by a substantially equal amount shown at 52, which results in substantially no change in the average value of the voltage $V_{UV}$. If it is desired to reduce the voltage $V_{AN}$, back to its original solid line curve 50, the firing points would be moved toward one another, and the change in the average value of the voltage $V_{UV}$ would again be substantially zero.

When the regulator is in the buck mode, the firing points are moved toward one another to increase the output voltage, and away from one another to reduce the output voltage. This type of differential or opposite movement again has substantially no affect on the average value of the voltage $V_{UV}$ across inductive means 31 and thus has no affect on the magnitude of the circulating current in inductive means 31. For example, when going from the solid line curve 55 to the dotted line curve of voltage $V_{AN}$ in the buck mode, a portion 56 is added to voltage $V_{UV}$, and a substantially equal portion 57 is subtracted, which results in substantially no change in its average voltage.

Figure 5:
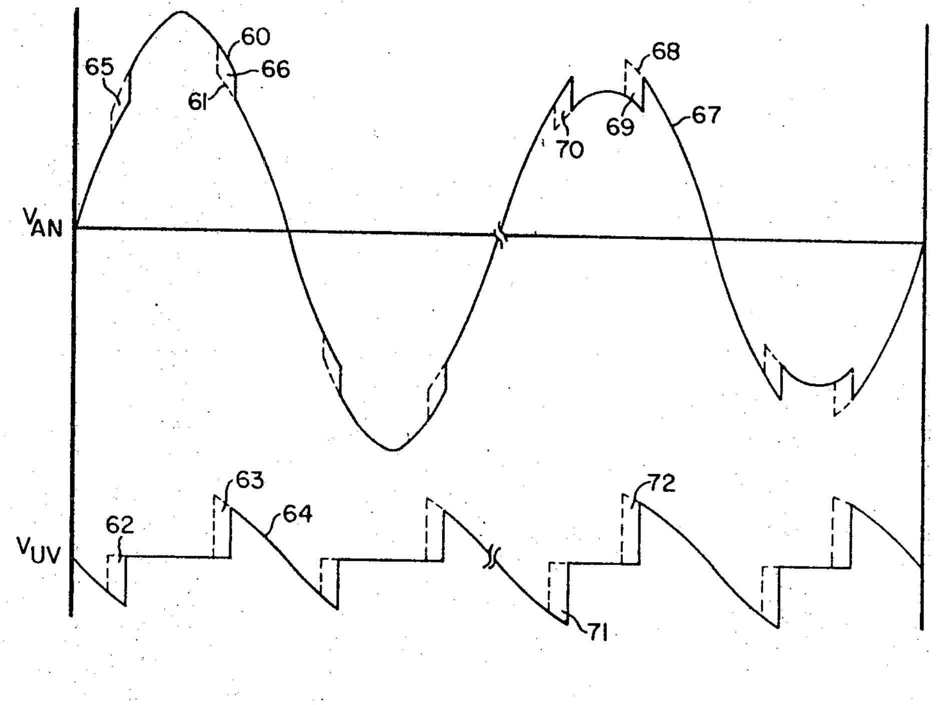

If the average value of the voltage $V_{UV}$ is to be changed, to maintain the circulating current in inductive means 31 above a predetermined magnitude, it may be accomplished as shown in the graphs of FIG. 5, without affecting the magnitude of the output voltage. In this instance, instead of moving the firing pulses towards one another, or away from one another, the angle between them is maintained, while advancing or retarding both firing points in the same direction over the control range of the regulator.

For example, assume the regulator is in the boost mode and voltage $V_{AN}$ is as shown by the solid line curve 60 in FIG. 5, which provides solid line curve 64 for the voltage $V_{UV}$, and it is desirable to increase the average value of the voltage $V_{UV}$, in order to maintain the instantaneous circulating current through inductive means 31, in the direction from terminal U to terminal V, above zero. Both firing points are advanced, and the voltage $V_{AN}$ now follows the dotted portion of curve 61. Portion 65 which is added to voltage $V_{AN}$ is substantially equal to the portion 66, which is subtracted from the voltage $V_{AN}$, thus maintaining the voltage $V_{AN}$ substantially the same as before the change in the firing angles of the switching pulses. However, this action adds portions 62 and 63 to the voltage $V_{UV}$, which increases its average value.

If the regulator is in the buck mode and both firing points are advanced, to change the voltage $V_{AN}$ from solid line curve 67 to include the dotted line portions 68, the added portion 69 is substantially equal to the subtracted portion 70, to maintain voltage $V_{AN}$ substantially unchanged. However, this action adds portions 71 and 72 to voltage $V_{UV}$, increasing its average value.

Retarding both the firing angles by an equal amount also has substantially no affect on the output voltage, but it reduces the average value of voltage $V_{UV}$.

Now, if it is desirable to change the output voltage $V_{AN}$, and the average value of the voltage $V_{UV}$, at the same time, it may be accomplished by firing control means which varies the time between the two pulses, and which also advances or retards both pulses together.

Thus, the basic regulator switching arrangement 25 shown in FIG. 1 requires a firing circuit which is responsive to two circuit parameters, which in this instance are the output voltage, and the circulating current in the inductive means 31, and which will provide two switching pulses each voltage half cycle, whose firing angles are responsive to the two circuit parameters.

FIG. 2 is a schematic diagram of the basic regulator circuit 25 shown in FIG. 1, with like reference numerals indicating like components in the two figures, and including a block diagram of a complete regulator system which may be constructed according to the teachings of the invention.

More specifically, FIG. 2, in addition to the basic regulator switching circuit 25, transformer 26, source potential 27, and load circuit 35, includes a direct current sensor 70 and a firing circuit 71. Direct current sensor 70 provides a signal responsive to the magnitude of the unidirectional circulating current flowing through inductive means 31. It is convenient to measure the circulating current magnitude at the center tap, as the effect of the instantaneous load current in each winding portion may then be cancelled. Winding portion 32 is connected to terminal 72, winding portion 33 is connected to terminal 73, and terminal 72 and 73 are connected internally in the direct current sensor to terminal A, which is connected to terminal 36 of load circuit 35. The signal proportional to the circulating current appears at terminals 76 and 77 of direct current sensor 70, which are connected to terminals 81 and 82, respectively, of firing circuit 71. Terminals 78, 79 and 80 of direct current sensor 70 are connected to terminals 85, 86 and 87, respectively, of firing means 71, for obtaining control voltages for the operation of the direct current sensor 70, and terminals 74 and 75 may be connected to winding 97, which is disposed on the same magnetic core as windings 32 and 33 of inductive means 31, to provide open loop compensation for the current signal as the input voltage waveform changes, as will be hereinafter described. Winding 97 has a center tap 98 which is connected to terminal 74 of direct current sensor 70, and the ends of the winding are connected through rectifiers 99 to terminal 75.

Firing circuit 71 has its terminals 83 and 84 connected to obtain a measure of the output voltage $V_{AN}$, at terminals 101 and 102, respectively, and has output terminals 88, 89, 90, 91, 92, 93, 94 and 95 for connection to the gate and cathode electrodes of solid state switching devices X1, X2, Y1 and Y2, with leads from these terminals to the switching devices being shown generally at 96.

Figure 6:
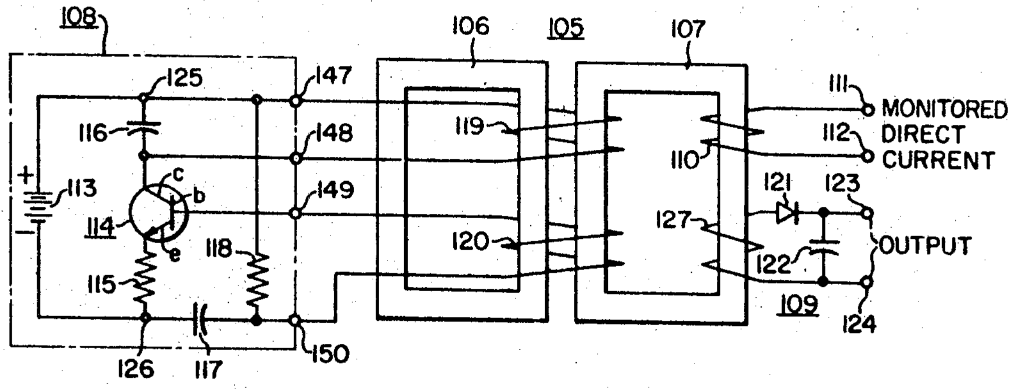
FIGS. 6 and 7 are schematic diagrams illustrating sensors which may be used to determine the magnitude of direct current flow.
Figure 7:
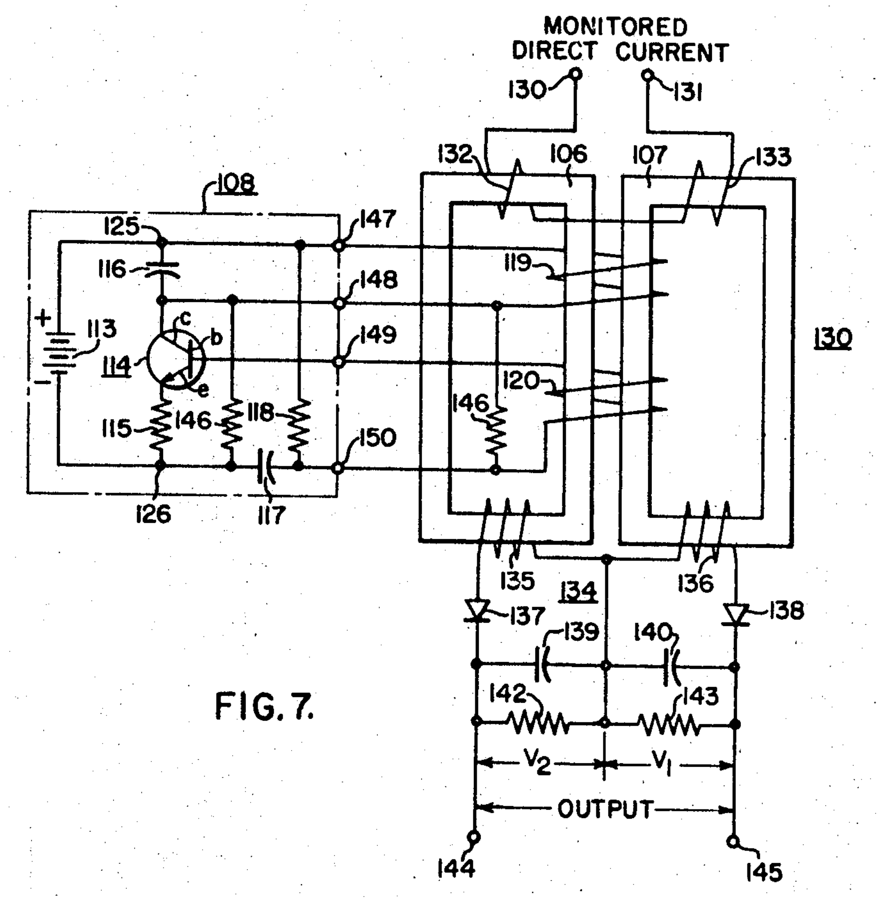
Figure 8:
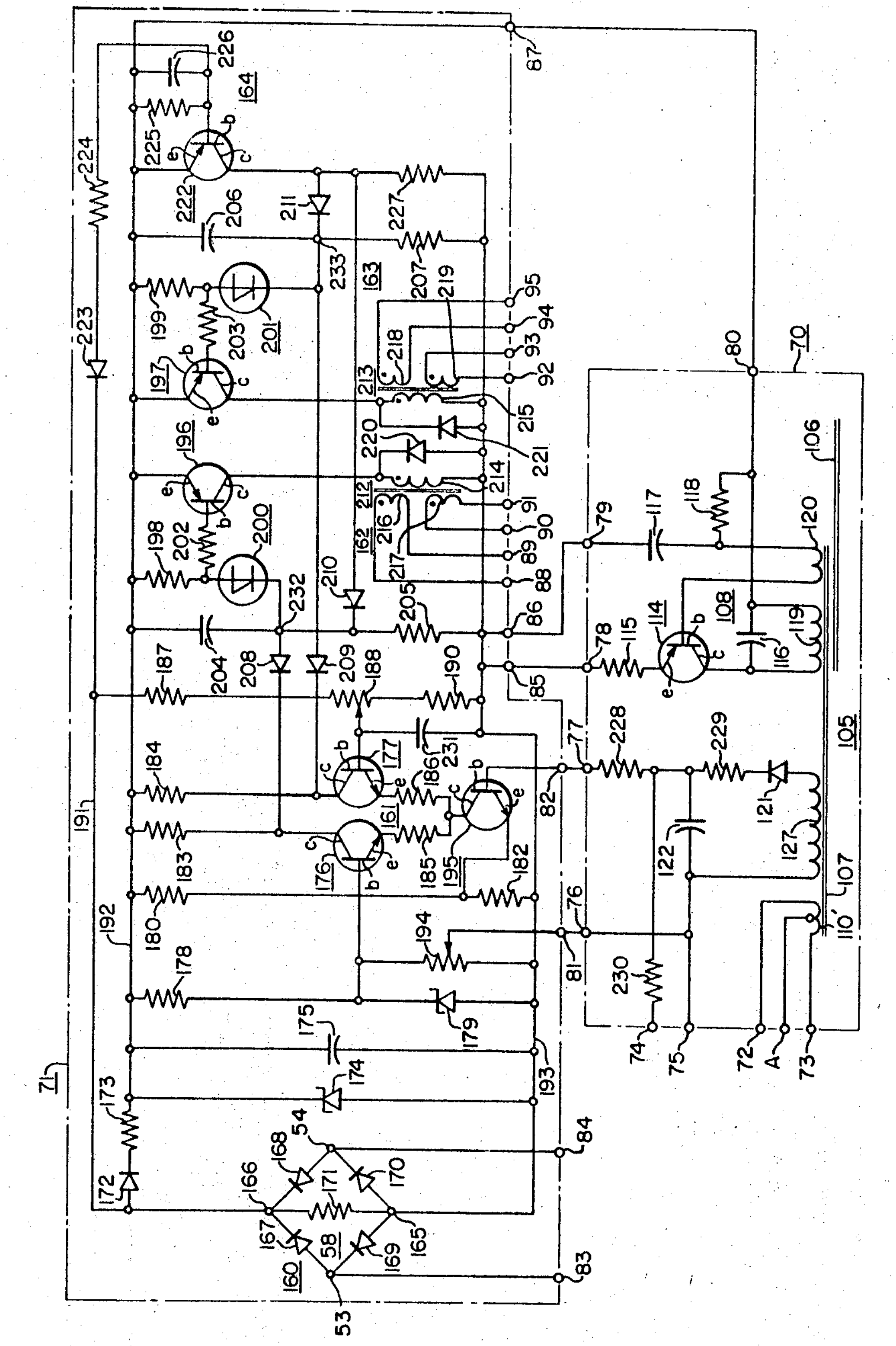
FIG. 8 is a schematic diagram of firing means and direct current sensor means which may be used in regulator apparatus constructed according to the teachings of the invention.

The direct current sensor 70 may be of any suitable type. FIGS. 6 and 7 show new and improved direct current sensors constructed according to embodiments of the invention, which may be adapted to measure the circulating current in the inductive means 31. The direct current sensor 105 shown in FIG. 6 may be used when it is not important to determine in which direction the direct current is flowing. Thus, this arrangement would be suitable for the direct current sensor 70 shown in FIG. 2, and it is shown in FIG. 8 adapted for use with a specific firing means.

In general, direct current sensor 105 includes a nonlinear magnetic circuit, having two magnetic core sections 106 and 107, an oscillator 108, a direct current winding 110 having terminals 111 and 112 for connection to the circuit whose direct current is to be measured, and an output circuit 109 which includes an output winding 127, a rectifier 121, and capacitor 122. The output circuit provides an isolated unidirectional output signal at terminals 123 and 124, proportional to the magnitude of the direct current flowing in direct current winding 110.

Oscillator means 108, which may be of any suitable type, such as the tickler coil type shown, has terminals 147, 148, 149 and 150, and includes an NPN junction type transistor 114 having emitter, base and collector electrodes, *e*, *b* and *c*, respectively, a source of unidirectional potential, such as battery 113, capacitors 116 and 117, resistors 115 and 118, and input coils 119 and 120. The input coils or windings 119 and 120 are wound about both magnetic core sections 106 and 107. Winding 119 and capacitor 116 are connected in parallel with respect to the collector electrode *c* of transistor 114, to form the tank circuit. The base electrode *b* is connected to one side of tickler coil 120, and the other side of tickler coil 120 is connected to the emitter electrode *e* through capacitor 117 and resistor 115. Resistor 118 is connected from the positive terminal of the source potential 113 to the junction between capacitor 117 and coil 120, and the source potential 113 is connected from the junction 125 between capacitor 116 and winding 119, and to the junction 126 between resistor 115 and capacitor 117.

The direct current and output windings 110 and 127, respectively, are both wound on the same magnetic core section, such as section 107. The direct current to be monitored, which flows through direct current winding 110, thus affects the effective reluctance of the magnetic circuit which couples the oscillator 108 to the output circuit 109. Thus, the output voltage appearing at terminals 123 and 124 of output circuit 109, which may be rectified by rectifier 121 and filtered by capacitor 122, varies with the monitored direct current. The frequency of the oscillator 108 determines the sampling rate of the sensor, and may, therefore, be selected to provide the response speed desired. The shunt magnetic circuit provided by the remaining magnetic core section 106 facilitates the diversion of the flux established by the oscillator, away from the output circuit 109, and it also aids in maintaining the desired oscillator frequency.

The two magnetic circuits provided by core sections 106 and 107 may be constructed of stampings, or of C-cores, which allows the windings to be made on ordinary bobbins.

Although not required by the regulator switching arrangement 25, in some applications it may be necessary to know in which direction the monitored direct current is flowing. FIG. 7 illustrates a direct current sensor 130 which will provide an output signal proportional to the magnitude of the monitored direct current, and having a polarity which indicates the direction of the flow of the monitored direct current. Like reference numerals in FIGS. 6 and 7 indicate like components.

More specifically, direct current sensor 130 includes two magnetic core sections 106 and 107, an oscillator 108 connected to windings 119 and 120 which are disposed on both magnetic core sections, a direct current circuit having windings 132 and 133 disposed on core sections 106 and 107, respectively, having terminals 130 and 131 for connection to the circuit whose direct current is to be measured, and an output circuit 134 which includes output windings 135 and 136 disposed on core sections 106 and 107, respectively, rectifiers 137 and 138, capacitors 139 and 140 resistors 142 and 143, and output terminals 144 and 145.

Magnetic core sections 106 and 107 should be biased to a predetermined point, in order to increase the output of one of the output windings, and to decrease the output of the other output winding, when the current is increasing in one direction, and to reverse this sequence when the current is increasing in the opposite direction. This may be accomplished by a separate bias winding which couples both magnetic core sections, and which is connected to a separate source of direct current potential, or it may be accomplished by bleeding a bias current through oscillator windings 119 or 120, such as may be provided by connecting a resistor 146 between the collector electrode of transistor 114 and junction 126. The output is balanced such that with no direct current flowing through direct current windings 132 and 133, the output voltages developed by windings 135 and 136, which voltages are rectified by rectifiers 137 and 138, filtered by capacitors 139 and 140, and developed across resistors 142 and 143, are equal and opposite. When current starts to flow in one direction, voltage V1 across resister 143 will increase, and voltage V2 across resistor 142 will decrease, resulting in terminal 145 being more positive than terminal 144. When current flows in the opposite direction, voltage V2 will increase, voltage V1 will decrease, and terminal 144 will be more positive than terminal 145.

Firing circuit 71 shown in FIG. 2 must provide suitable firing pulses for the static switching devices in the regulator system, which pulses are responsive to two parameters in the regulated system. FIG. 8 is a schematic diagram of a new and improved firing circuit 71 which may be used, constructed according to another embodiment of the invention, along with a direct current sensor 70, which is essentially the same as the direct current sensor 105 shown in FIG. 6, and hereinbefore described.

In general, firing circuit 71 includes voltage sensing means 160 for obtaining a measure of the output voltage to be regulated, a differential amplifier 161, first and second pulse producing means 162 and 163, and reset means 164. The signal responsive to the direct current magnitude flowing is inductive means 31 of FIG. 2, is applied to input terminals 81 and 82 of firing circuit 71, from direct current sensor 70.

More specifically, voltage sensing means 160 includes a full wave, single-phase bridge rectifier circuit 58 having rectifiers or diodes 167, 168, 169 and 170, connected to input terminals 53 and 54, and to output terminals 165 and 166, in a manner well known in the art. Voltage sensing means 160 provides a unidirectional signal responsive to the output voltage to be regulated, and this unidirectional potential is also used for providing the unidirectional power required for the operation of the firing circuit 71. Voltage sensing means 160 is also used to provide the reset timing for the reset circuit 164. A resistor 171 is connected across the output terminals 165 and 166 of bridge rectifier circuit 162, in order to bring each rectifier voltage half cycle down to substantially zero, which is necessary for reset purposes. Rectifier 172 is connected to the output terminal 166 of bridge rectifier 58, in order to isolate the bridge rectifier circuit from the capacitance of the firing circuit, which is also necessary in order to bring the rectified half cycle waveforms to substantially zero potential. Resistor 173, connected to blocking rectifier 172, and capacitor 175, which is connected from one end of resistor 173 to the output terminal 165 of the bridge rectifier circuit 58, form a waveform filter for the unidirectional potential appearing across conductors 192 and 193. Zener diode 174, which is connected between conductors 192 and 193, regulates the magnitude of this unidirectional potential to a predetermined magnitude.

Differential amplifier 161 includes first and second NPN junction type transistors 176 and 177, each having base, collector and emitter electrodes *b*, *c* and *e*, respectively. The collector electrodes of transistors 176 and 177 are connected to conductor 192 through resistors 183 and 184, respectively, the emitter electrodes of transistors 176 and 177 are connected in common through resistors 185 and 186, respectively, and the commonly connected emitter electrodes are connected to a voltage divider which includes resistors 180 and 182, through a transistor 195. Transistor 195, which has collector, base and emitter electrodes, *c*, *b* and *e*, respectively, has its emitter electrode *e* connected to the junction between resistors 180 and 182, its collector electrode *c* connected to the commonly connected emitter electrodes of transistors 176 and 177, and its base electrode *b* connected to input terminal 82.

The base electrode *b* of transistor 176 is connected to the junction between a resistor 178 and a Zener diode 179, which are connected serially between conductors 192 and 193. Zener diode 179 provides a reference voltage or signal for the differential amplifier 161. An adjustable resistor 194 is connected across Zener diode 179, to provide a reference for the current signal, with the adjustable arm on resistor 194 being connected to terminal 81.

The voltage responsive signal from bridge rectifier 58 is applied to the base electrode *b* of transistor 177 via conductor 191, which is connected to the output terminal 166 of bridge rectifier 58, and the voltage divider comprising serially connected resistors 187, 188 and 190, which are connected between conductor 191 and conductor 193. Resistor 188 is of the adjustable type, with its adjustable arm being connected to the base electrode *b* of transistor 177, which provides an adjustment for the voltage responsive signal. A capacitor 231 is connected from the base electrode *b* to conductor 193 which, along with resistor 187, provide a waveform filter for the voltage responsive signal applied to transistor 177.

The first pulse producing circuit 162 includes an RC circuit comprising serially connected capacitor 204 and resistor 205, which are connected between conductors 192 and 193; a diode 208 connected from the collector electrode *c* of transistor 176 to the junction 232 between capacitor 204 and resistor 205; a voltage breakdown device 200, such as a Shockley diode, and a resistor 198, which are serially connected between junction 232 and conductor 192; a transistor 196, which is used to amplify the pulse when the voltage across breakdown device 200 reaches the threshold magnitude, and device 200 breaks down and conducts current; a pulse transformer 212 having a primary winding 214 and secondary windings 216 and 217; and, a rectifier 220. The base electrode *b* of transistor 196 is connected through resistor 202 to the junction between the voltage breakdown device 200 and resistor 198, the emitter electrode *e* of transistor 196 is connected to conductor 192, and the collector electrode *c* of transistor 196 is connected to winding 214 of transformer 212, which in turn is connected to conductor 193. Rectifier 220 is connected across primary winding 214, to provide a free-wheeling circuit for the current in winding 214 when transistor 196 becomes non-conductive. Windings 216 and 217 are connected to terminals 88, 89, 90 and 91, respectively, which are connected to provide the switching pulses for the solid state switching devices in the basic regulator switching circuit 25.

The second pulse producing means 163 is similar to the first pulse producing means 162, haivng an RC circuit comprising a capacitor 206 and resistor 207 connected between conductors 192 and 193; a diode 209 connected from the collector electrode *c* of transistor 177 to the junction 233 between capacitor 206 and resistor 207; a voltage breakdown device 201 and resistor 199, which are serially connected from conductor 192 to junction 233; a transistor amplifier comprising transistor 197; a pulse transformer 213 having a primary winding 215 and secondary windings 218 and 219; and, a rectifier 221. The base electrode *b* of transistor 197 is connected to the junction between the breakdown device 201 and resistor 199 through a resistor 203. The emitter electrode *e* of transistor 197 is connected to the conductor 192, and the collector electrode *c* of transistor 197 is connected to the primary winding 215 of pulse transformer 213. The other end of the primary winding 215 is connected to conductor 193. Rectifier 221 is connected across winding 215, in order to provide a free-wheeling current path for the current in winding 215. Windings 218 and 219 are connected to terminals 94 and 95, and 92 and 93, which are in turn connected to the solid state switching devices in the basic regulator arrangement 25.

Reset means 164 includes a transistor 222 which is of the PNP junction type, having collector, emitter and base electrodes *c*, *e* and *b*, respectively, resistors 224, 225 and 227, a capacitor 226, and diodes 210, 211 and 223. The emitter electrode *e* of transistor is connected to conductor 192, its collector electrode *c* is connected to conductor 193 through resistor 227, and its base electrode *b* is connected to conductor 192 through resistor 225. Its base electrode *b* is also connected to conductor 192 through a capacitor 226, and to conductor 191 and the positive output terminal 166 of bridge rectifier 58 through serially connected rectifier 223 and resistor 224. When the voltage applied to rectifier 223 drops below the voltage of conductor 192, transistor 222 will conduct, which allows capacitor 206 to reset through diode 211 to the potential of conductor 192, and allows capacitor 204 to reset through diode 210, to the potential of conductor 192.

The direct current sensor 70 shown in FIG. 8 is essentially the same as the direct current sensor 105 shown in FIG. 6, except that resistors 228 and 229 have been added for waveform filtering, and open loop compensation is added through terminals 74 and 75, with terminal 74 being connected through resistor 230, to the junction between resistors 228 and 229, and terminal 75 being connected to the other side of winding 127, and to output terminal 76. As shown in FIG. 3, the circulating current $i_c$ is at its lowest magnitude during the central or control portion of each half cycle, and the sum of circulating current $i_c$ and $\frac{1}{2}i_L$ drops to its lowest magnitude in the central portion of one voltage half cycle in one of the winding sections of inductive means 31, and the next voltage half cycle in its other winding section. By adding a signal to the current responsive signal which increases during the center of each voltage half cycle, it will insure that the waveform $i_c+\frac{1}{2}i_L$ will remain above zero.

In the operation of the firing control means 71 and direct current sensor 70, the voltage responsive signal is applied to the normal input of the differential amplifier 161, at the base electrode *b* of transistor 177, and the current responsive signal from the direct current sensor 70 is applied as a common mode signal. Each of the two outputs of the differential amplifier 161, i.e., the collector electrodes of transistors 176 and 177, is associated with the control of a position of one of the required firing pulses during each voltage half cycle. To aid in the understanding of the manner in which the pulses are produced, and controlled by the output voltage of the regulator system, and direct current in inductive means 31, the charts shown in FIG. 9 will be referred to.

At the start of each voltage half cycle, the full wave rectified voltage across blocking diode 223 drops below the lower filtered voltage applied to conductor 192, and transistor 222 of reset means 164 becomes conductive, which forward biases the diodes 211 and 210, resetting capacitors 206 and 204, respectively, to the voltage level of conductor 192.

When the next positive voltage half cycle starts and cuts off transistor 222, which cuts off diodes 210 and 211, capacitors 204 and 206 each charge rapidly to the voltage of their associated collector electrodes, through diodes 208 and 209, respectively. When capacitors 204 and 206 reach the output voltages of their respective collector electrodes, capacitors 204 and 206 each charge more slowly, generating a reverse voltage determined by the RC circuits, comprising resistor 205 and capacitor 204, and resistor 207 and capacitor 206. However, before reaching the aiming voltage of conductor 193, the ramp voltages across the threshold levels provided by the breakdown diodes 200 and 201. In other words, the potential across the breakdown devices 200 and 201 increases as capacitors 204 and 206 charge, respectively, and when the potential across the breakdown devices reach their threshold levels they will conduct. The point in the voltage half cycle at which each ramp voltage reaches the threshold voltage of its associated breakdown diode, determines the firing point.

When the voltage across breakdown diode 200 reaches its breakdown value, transistor amplifier 196 will be turned on and current will flow through the primary winding 214 of pulse transformer 212. A current pulse will be applied to the gate-cathode junction of solid state switching means Y1 and Y2 of regulator switching arrangement 25 shown in FIG. 2. During the boost mode, pulse transformer 212 will provide the second signal in each half cycle. In the positive half cycle of the boost mode devices X2 and X1 are conductive at this point. Device Y2 will be forward biased, switching to the conductive condition, device X2 will turn off, and device Y1 will remain non-conductive. In the negative half cycle of the boost mode, device Y1 will be gated on and device X1 will turn off. During the buck mode, pulse transformer 212 will provide the first signal in each half cycle of the supply voltage. Thus, in the positive half cycle of the buck mode, device Y2 will be gated on, as device Y1 is already conductive, and device X2 will turn off. In the negative half cycle of the buck mode, device Y1 will be gated on, as device Y2 will already be conductive, and device X1 will turn off.

When the voltage across breakdown diode 201 reaches its breakdown level, transistor amplifier 197 will be turned on and current will flow through the primary winding 215 of pulse transformer 213. A current pulse will be applied to the gate-cathode junctions of switching means X1 and X2 of the regulator switching arrangement 25 shown in FIG. 2. During the boost mode, pulse transformer 213 will provide the first switching signal in each half cycle. Thus, in the positive half cycle of the boost mode, device X1 will be gated on, as device X2 will already be conductive, and device Y1 will turn off. In the negative half cycle of the boost mode, device X2 will be gated on, as device X1 will already be conductive, and device Y2 will turn off. During the buck mode, pulse transformer 213 will provide the second signal in each half cycle. Thus, in the positive half cycle of the buck mode, device X1 will be gated on as only device X1 will be forward biased, and device Y1 will turn off. In the negative half cycle of the buck mode, device X2 will be gated on, as only device X2 will be forward biased, and device Y2 will turn off.

Figure 9:
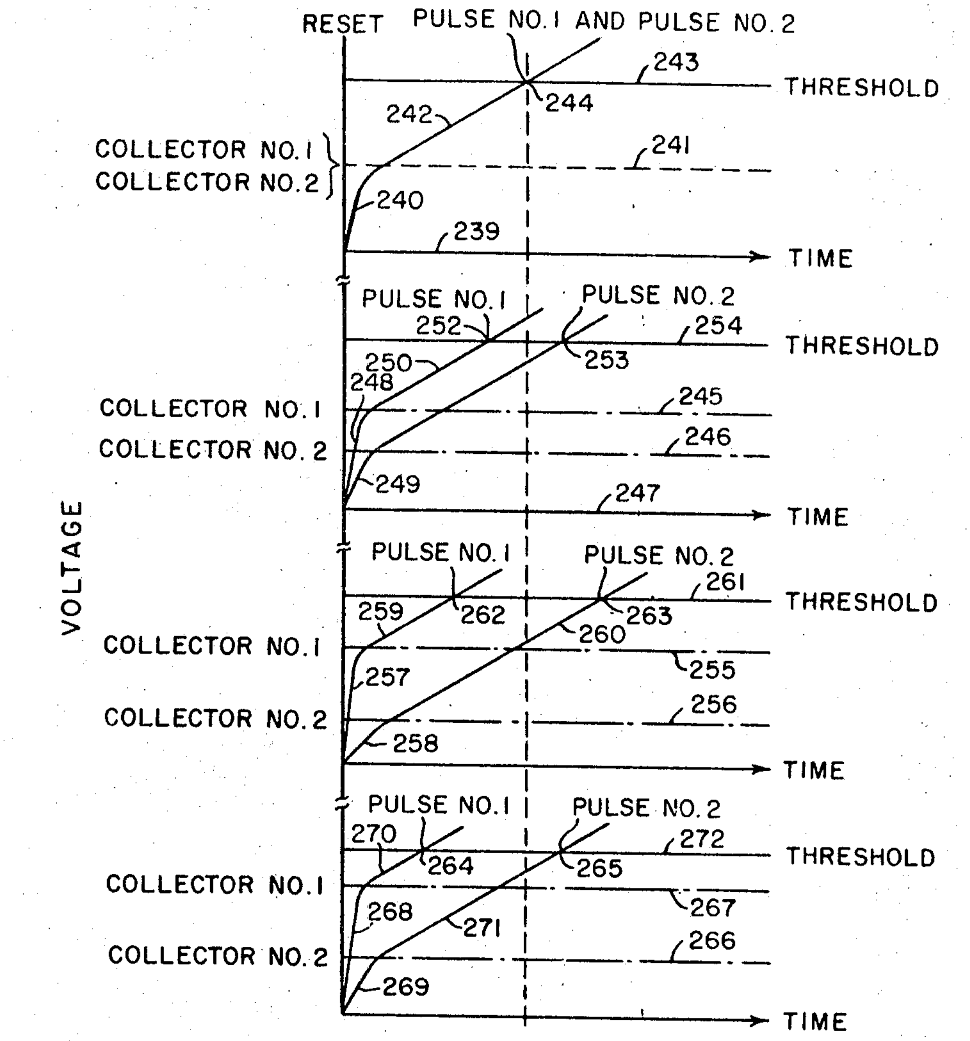
FIG. 9 is a graph which illustrates the operation of the firing means shown in FIG. 8.

Therefore, in FIG. 9, if the voltage responsive signal applied to the base electrode *b* of transistor 177 is equal to the reference voltage applied to the base electrode *b* of transistor 176, the collector voltages of transistors 176 and 177 will be the same. Capacitors 204 and 206 will both start from line 239, which represents their charge level when diodes 210 and 211 are forward biased by reset means 164, they will follow curve 240 to the collector voltage level 241, and upon reaching the collector voltage diodes 208 and 209 will be reversed biased, and capacitors 204 and 206 will both follow the ramp voltage 242 until reaching the threshold voltage 243 of the breakdown or Shockley diode, at which point 244 both pulses will be generated.

In this instance, the curve 41 of the voltage $V_{UV}$, shown in FIG. 3, across the inductive means 31, shown in FIG. 2, would not have an intermediate horizontal portion, but would follow voltage $V_{YX}$ until the pulses are produced, and would then jump to voltage $V_{UV}$. It will be noted that the average voltage $V_{UV}$ may be changed by changing the common mode signal applied to the commonly connected emitter electrodes of transistors 176 and 177, which will change both collector voltages equally in the same direction. Thus, the collector voltage line 241 may be raised and lowered by the direct current sensor signal, which changes the average voltage $V_{UV}$ in response to the direct current in the inductive means 31, but the output voltage would remain unchanged.

Now, assume that the voltage signal applied to transistor 177 increases above the reference voltage. The voltage on collector *c* of transistor 177 will decrease to that represented by line 246, and the voltage on collector *c* of transistor 176 will increase to that represented by line 245. Therefore, pulse circuit 162, which is associated with the collector electrode *c* of transistor 176, will provide the first pulse, and pulse circuit 163 will provide the second pulse. Capacitors 204 and 206 start at the reset voltage level 247, move rapidly along curves 248 and 249, respectively, until reaching the voltage of their respective collector electrodes, and then follow ramp voltages 250 and 251, respectively, until reaching the threshold voltage level 254 at points 252 and 253, respectively. It will be noted that the two firing points are now spaced apart. If the situation were to be reversed, with the voltage signal applied to transistor 177 decreasing below the reference voltage, the voltage on collector electrode *c* of transistor 177 will increase, and the collector voltage of transistor 176 will decrease. Thus, the sequence of firing signals in each half cycle would then be reversed, with the first signal being from pulse circuit 163, and the second signal being from pulse circuit 162.

If the difference between the voltage responsive signal and the reference voltage signal increases still further, the pulses will be separated still further from one another in the voltage half cycle. For example, if the collector voltage of one transistor increases to the level of line 255, and the collector voltage of the other transistor drops to the level of line 256, the charge on the capacitors will change rapidly along curves 257 and 258 to their respective collector voltages, and then the charge on the capacitor will follow ramp voltages 259 and 260, until crossing the threshold voltages 261, providing firing pulses at points 262 and 263.

Assuming that the voltage output represented by firing pulses 262 and 263 is to be maintained, and that the average voltage $V_{UV}$ across inductive means 31 is to be increased, the current signal will increase the collector voltages by the same amount, to the levels shown by curves 266 and 267. The charge on the capacitors will thus start at their reset level, rapidly change along curves 268 and 269 to their respective collector voltages, and then charge on the capacitors will change along ramp voltages 270 and 271, providing pulses at points 264 and 265, which are earlier in the voltage half cycle than pulses 262 and 263, respectively, but still spaced the same number of electrical degrees apart. The reverse will be true if the current signal is reduced, to thus reduce the magnitude of the collector voltages by the same amount.

In the firing circuit 71 shown in FIG. 8, both ramp voltages have the same aiming potential, which causes a slightly unsymmetrical movement of the two pulses. In other words, the pulses moving toward the start of the half cycle will move further for a given collector voltage change, then the pulse moving away from the start of the voltage half cycle, due to the fact that they have different starting potentials, i.e., different collector voltages. This feaure is desirable when used with the basic regulator switching arrangements 25, because it is preferably during a transient caused by sudden changes in the input voltage to have an increase, rather than a decrease, in the circulating current.

Figure 10:
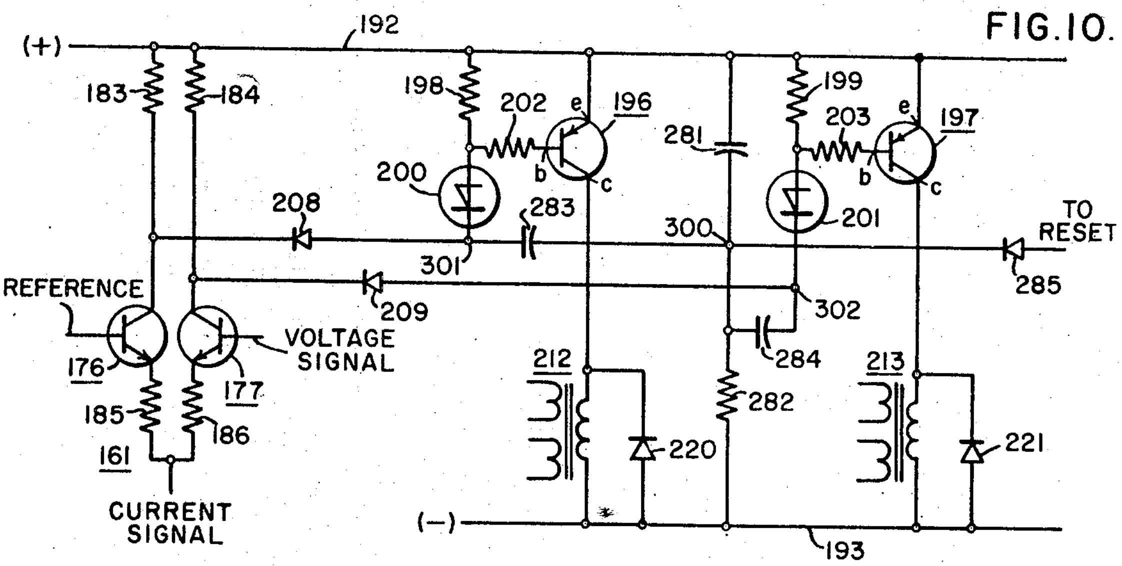
FIG. 10 is a schematic diagram which illustrates a modification which may be made to the firing means shown in FIG. 8.

In other applications of the firing circuit shown in FIG. 8, it may be desirable to have a symmetrical movement of the pulses for any given change in the collector voltages. FIG. 10 is a schematic diagram which illustrates changes or modifications which may be made to the schematic diagram of FIG. 8 to achieve this result. Like reference numerals in FIGS. 8 and 10 indicate like components, and the partial circuit of FIG. 10 may be completed in exactly the same manner as the schematic diagram shown in FIG. 8.

Specifically, FIG. 10 illustrates a firing circuit which uses only one ramp generator for both pulses. Therefore, the ramp slope is always the same for both firing pulses. Two firing pulses are provided by utilizing a capacitor associated with each Shockley or breakdown diode, with the capacitors first being charged to values which are responsive to their associated collector voltages, and then the charge on the capacitors remains constant as the voltages on the capacitor plates follow the slope of the ramp voltage provided by the RC circuit. Thus, the two firing pulses in each cycle are responsive to their associated collector voltages, and since the ramp voltages have the same slope for both pulses, the movement of the pulses is symmetrical.

An RC circuit comprising capacitor 281 and resistor 282 is connected across the supply potential represented by conductors 192 and 193, with the resistor and capacitor being connected at junction 300. A single reset diode 285, connected to the reset circuit 164 shown in FIG. 8, is required, which is connected to the junction 300. A capacitor 283 is connected from junction 300 to the collector electrode *c* of transistor 176, through diode 208. The breakdown diode 200 is connected to the junction 301 between diode 208 and capacitor 283. In like manner, a capacitor 284 is connected to junction 300, and to the collector electrode *c* of transistor 177, through diode 209. The breakdown diode 201 is connected to the junction 302 between diode 209 and capacitor 284.

When reset circuit 164 of FIG. 8 becomes conductive and diode 285 is forward biased, junction 300 is taken to the voltage of conductor 192, capacitor 281 resets to this value, and capacitors 283 and 284 reset. Capacitors 283 and 284 go positive by the amount that junction 300 was increased, which turns the breakdown diodes 200 and 201 off, if they were still conductive. Capacitor 281 then starts to generate its ramp voltage taking the plates of capacitors 283 and 284 connected to point 300 with it. The other plates of capacitors 283 and 284 are quickly charged through diodes 208 and 209, respectively, to the voltage across the collector resistors 183 and 184, respectively. Diodes 208 and 209 are then cut off. The charging of the plates of capacitors 283 and 284 connected to the collector electrodes is much more rapid than the change in voltage on the plates connected to junction 300, due to different RC time constants. Then both plates of capacitors 283 and 284 follow the ramp voltage provided by capacitor 281 and resistor 282, with the plates of the capacitors connected to the breakdown diodes remaining at a higher potential than junction 300, thus providing the offset in the two ramp voltages required for the operation of the circuit. When each ramp voltage reaches the threshold of its associated breakdown diode, the breakdown diodes conduct, providing the required firing pulses through its associated amplifiers and pulse transformers.

While the firing circuits have been described as adding the output voltages of the differential amplifier to the ramp voltages, in order to provide the timing for the switching pulses, it is to be understood that the output voltages could be used just as effectively to change the threshold levels, and thus use constant ramp voltage generators.

Regulators for alternating current systems, such as the regulator system shown in FIG. 2, often require the RMS output voltage to be regulated. This presents no difficulty, if the form factor of the output voltage waveform is substantially constant over the regulator range. If the form factor is constant, the mean and RMS values will be proportional, allowing the mean of the output voltage to be used to indicate and regulate the RMS value.

The disclosed regulator switching action, however, does not provide a constant form factor over the regulated range. Therefore, sensing and regulating the mean output voltage to a predetermined constant, will provide an RMS output voltage which will not be constant, but which will change with the form factor of the output voltage.

This problem may be solved by using an RMS detector and a high gain regulator loop. For example, if the input voltage may vary plus or minus 20%, and the RMS output voltage is to be maintained within plus or minus one-half percent, the loop gain must be at least 40.

RMS detectors, however, are more complex and costly than mean detectors, as they must detect the effective value of the waveform, i.e., that value used in power calculations. Further, high gain regulator systems are sensitive, and often unstable. Therefore, it would be desirable to be able to regulate the RMS output voltage of an alternating current voltage regulator, by sensing the mean output voltage, even though the form factor of the output volage waveform is changing. Further, it would be desirable to accomplish this with a lower loop gain than would be required using an RMS detector. Anothre embodiment of the invention discloses how this may be accomplished.

If the regulator range were over a complete 180 degree half cycle, the magnitude of the form factor would generate substantially a sine wave. In the regulator disclosed herein, the regulator action is most effective between 45 and 135 degrees of each voltage half cycle, because beyond these points, the voltage which may be added or subtracted becomes negligible. Thus, in the regulated range, the magnitude of the form factor is on a portion of the form factor sine wave which approaches a straight line. Now, instead of utilizing an RMS detector and a regulator system having a high loop gain, a simple mean detector, such as a retifier and a filter, is used, and the loop gain of the regulator is deliberately reduced to that point where the regulator is unable to maintain the mean ouput voltage constant over the range of input voltage. Further, the loop gain is selected to be such a value that the curve of the mean output voltage versus the RMS input voltage has a slope which is substantially equal in magnitude to the slope of the form factor curve in the regulated range, but of opposite sign. Thus, as the form factor decreases in magnitude, the mean output voltage increases by substantially the same amount, and when the form factor increases in magnitude, the means output voltage decreases by substantially the same amount. It has been found that over the control range of the regulator, using this arrangement, the product of the mean output voltage and the form factor will be substantially constant. Since the form factor is equal to the RMS voltage divided by the mean voltage, it follows that if the product of the form factor and the mean output voltage is held constant over the regulated range, the RMS output voltage will be constant.

Figure 11:
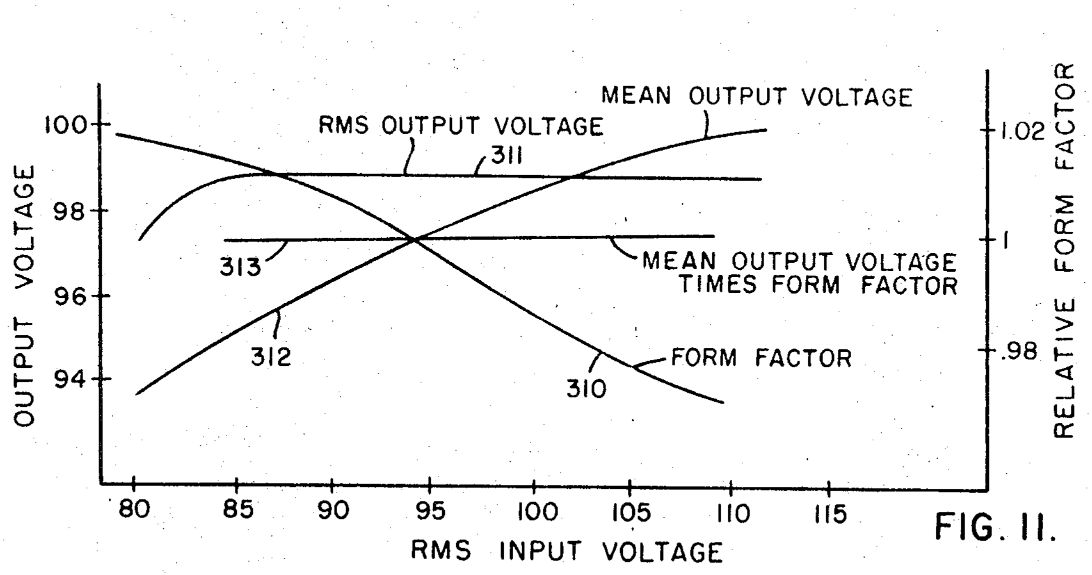
FIG. 11 is a chart illustrating how the RMS output voltage of the controlled system may be maintained constant by sensing the mean output voltage, while the form factor of the output voltage is changing, according to the teachings of another embodiment of the invention.

FIG. 11 is a graph which illustrates typical characteristics of the regulator shown in FIGS. 2 and 8, constructed according to these teachings, using a mean detector in the form of rectifier 58 and its associated filter means, and using a deliberately selected loop gain which is substantially lower than that required if an RMS detector were to be used.

Curve 130 illustrates how the form factor of the output voltage changes over the regulating range of the regulator, curve 312 illustrates how the mean output voltage changes as the RMS input voltage changes over the regulated range, with the slope of curve 312 being equal in magnitude to the slope of curve 310, but having an opposite sign. Curve 313 illustrates that the product of the form factor and the mean output voltage is substantially constant over the regulated range of the regulator, and curve 311 indicates that the RMS output voltage remains constant over the regulated range. Curves 311 and 312 are actual measured values in a regulator system constructed according to the disclosed teachings, using a regulator loop gain which was one-fourth of the loop gain that would be required if an RMS detector were to be used to regulate the RMS output voltage. Curve 311 was measured with a true RMS indicating meter, and curve 312 was measured with a rectifying type AC indicating meter.

Figure 12:
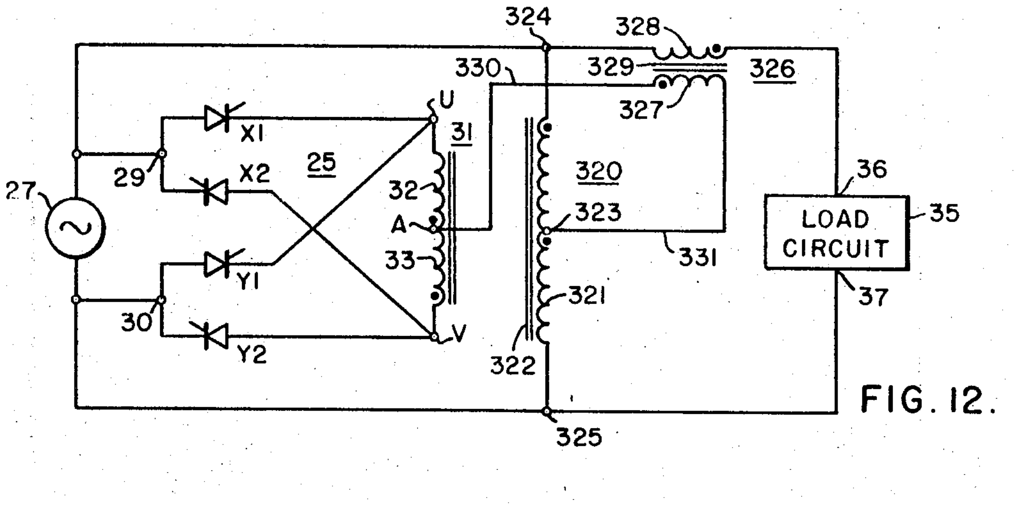
FIGS. 12 and 13 are schematic diagrams illustrating additional embodiments of the regulator arrangement shown in FIGS. 1 and 2.

In the regulator switching arrangement 25 shown in FIG. 1, the solid state switching devices X1, X2, Y1 and Y2 operate at the relatively low voltage between taps X and Y, but they must have a relatively high current capacity. FIG. 12 illustrates how the basic switching arrangement 25 may be connected to utilize solid state switching devices of high voltage, but lower current ratings, than the arrangement of FIG. 1. Like reference numerals in FIGS. 1 and 2 indicate like components.

More specifically, in the arrangement shown in FIG. 12, instead of connecting input terminals 29 and 30 of regulator switching arrangement 25 to taps on a transformer, they are connected directly across the output terminals of source potential 27. A center-tapped autotransformer 320 is also connected across the output terminals of the source potential, and a two winding transformer 326 is used, with one of its windings being connected in series with the source potential 27 at the load circuit 35.

Autotransformer 320 has a winding 321 disposed in inductive relation with a magnetic core 322, with one of its end terminals 324 being connected to one side of the source potential 27, and the other of its end terminals 325 being connected to the other side of the source potential. Autotransformer 320 has a center tap 323.

Transformer 326 has windings 327 and 328 disposed in inductive relation with a magnetic core 329, with winding 328 being serially connected with source potential 27 and load circuit 35. Winding 327 is connected between the center tap A of inductive means 31 and the center tap 323 of autotransformer 320. Thus, some proportion of the voltage between the center taps of inductive means 31 and autotransformer 320, is either added to or subtracted from the source potential 27. The regulator switching arrangement 25 operates in the same manner as hereinbefore described relative to FIGS. 1 and 2. The firing circuit and direct current sensor have not been shown in FIG. 12, as they may be the same as hereinbefore shown and described.

In FIG. 12, autotransformer 320 is necessary in order to provide a voltage reference which allows the resultant voltage across transformer 326 to be reversed in phase, to thus allow the regulator to either buck or boost the source potential, as required.

Figure 13:
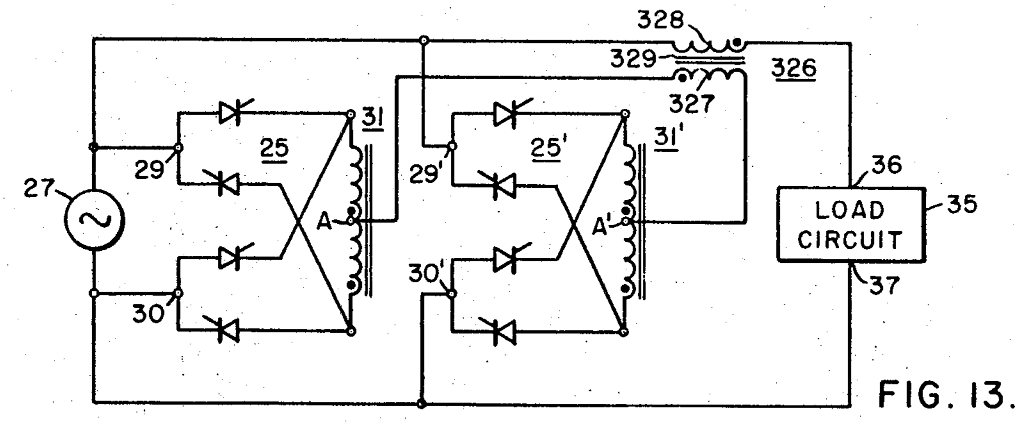

FIG. 13 illustrates a switching arrangement for a single phase electrical system, which not only eliminates the autotransformer, but provides an output voltage waveform, which in the prior art would require five taps and ten solid state switching devices to achieve, and additionally provides an output voltage which is substantially symmetrical about the 90 degree point of each voltage half cycle, which the prior art system having five taps would be unable to do.

Figure 14:
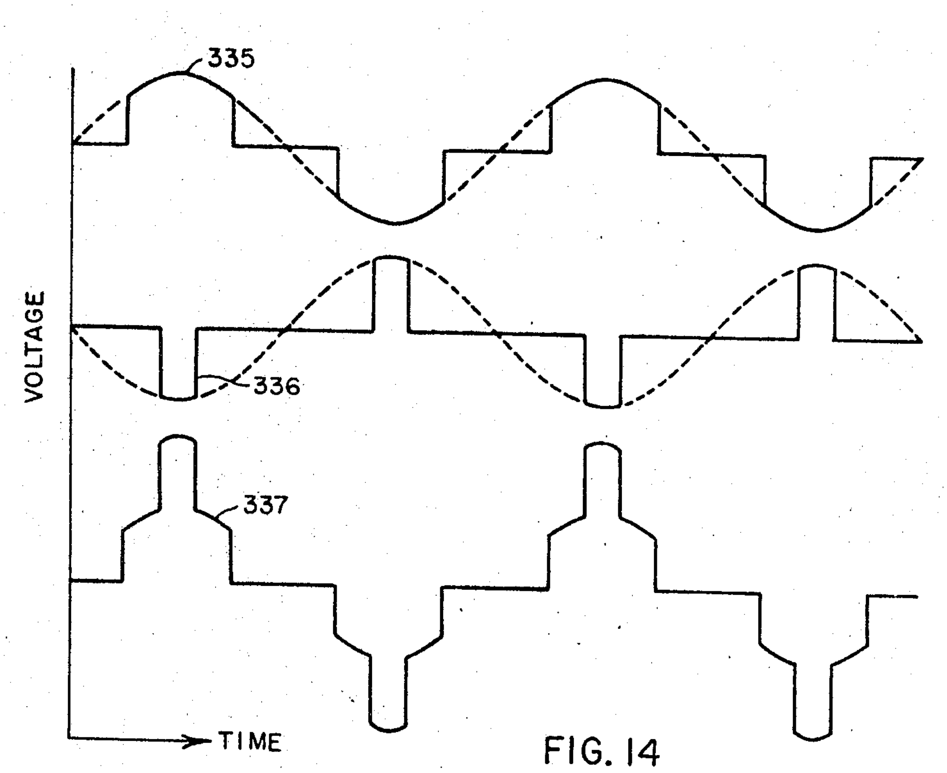
FIG. 14 is a graph illustrating voltage waveforms which aid in understanding the operation of the schematic diagrams shown in FIG. 13.

The circuit arrangement of FIG. 13 is similar to that of FIG. 12, except a basic regulator switching arrangement 25′ replaces autotransformer 320. Like reference numerals in FIGS. 12 and 13 indicate like components. Specifically, two basic switching arrangements 25 and 25′ are used in FIG. 13, both having their input terminals connected across the source potential 27. Windings 327, instead of being connected between the center taps of the inductive means 31 and the autotransformer 320, is connected between the center taps A and A′ of inductive means 31 and 31′, respectively. Thus, the primary winding 427 of transformer 326 sees the sum of the voltages of the two regulator switching arrangements, and applies this sum in series with the source potential. FIG. 14 is a graph which illustrates typical waveforms generated in the arrangement shown in FIG. 13. Curve 335 illustrates the voltage waveform between center tap A of inductive means 31, and the midpoint of the source potential 27, curve 336 illustrates the voltage waveform between the center tap A′ of inductive means 31′ and the midpoint of the source potential 27, and curve 337 shows the voltage waveform of the sum of these two voltages, which sum is applied to winding 327 of transformer 326. This composite voltage from regulator switching arrangements 25 and 25′ may either boost or buck the source potential 27.

Figure 15:
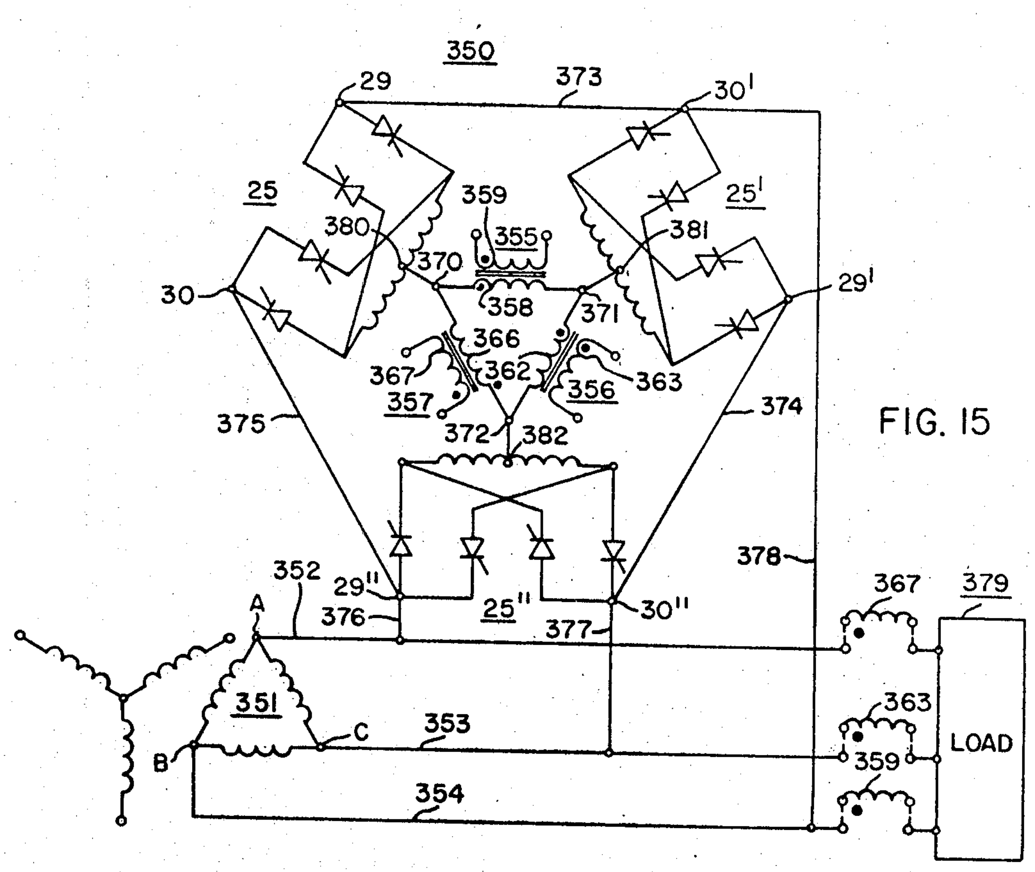
FIG. 15 is a schematic diagram which illustrates a three-phase regulator system constructed according to the teachings of the invention.

The regulator arrangement shown in FIGS. 1, 12 and 13 may be applied to polyphase systems by extending the teachings hereinbefore described relative to single phase system. FIG. 15, however, illustrates a three-phase regulator system constructed according to another embodiment of the invention, in which the basic switching circuits are connected across the phases of the three-phase system, similar to the teachings shown in FIG. 12 relative to a single-phase system, but which differs from this teaching by eliminating the mid-tapped autotransformer, and is thus not a normal extension of the single-phase teachings. In this embodiment, three basic regulator switching arrangements 25, 25′ and 25″ are used. along with three transformers 355, 356 and 357. Transformer 355 has primary and secondary windings 358 and 359, transformer 356 has primary and secondary windings 362 and 363, and transformer 357 has primary and secondary windings 366 and 367. The primary windings of transformers 355, 356 and 357 are connected in a delta arrangement, with primary winding 358 being connected to primary windings 366 and 362 at terminals 370 and 371, respectively, primary winding 366 being connected to primary windings 358 and 362 at terminals 370 and 372, respectively, and primary winding 362 being connected to primary windings 366 and 359 at terminals 372 and 371, respectively. The common terminals of the delta connected primary windings are connected to the center taps on the inductive means of each of the three basic regulator switching arrangements. Terminal 370 is connected to the midtap 380 of switching arrangement 25, terminal 371 is connected to the midtap 381 of switching arrangement 25′, and terminal 372 is connected to midtap 382 of switching arrangement 25″. The input terminals of the basic regulator switching arrangements are interconnected, with terminal 29 of switching arrangement 25 being connected to terminal 30′ of switching arrangement 25′, via conductor 373; terminal 29′ of switching arrangement 25′ being connected to terminal 30″ of switching arrangement 25″ via conductor 374; and, terminal 29″ of switching arrangement 25″ being connected to terminal 30 of switching arrangement 25, via conductor 375. The common connections between the basic switching arrangements are connected to a source of three-phase alternating potential represented by a delta connected secondary winding 351 of a transformer, having terminals A, B and C, connected to conductors 352, 354 and 353, respectively. For purposes of example, it will be assumed that secondary winding 367 of transformer 357 is connected in conductor 352 between secondary winding 351 and the load 379, that secondary winding 362 of transformer 356 is connected in series with conductor 353, and that secondary winding 359 of transformer 355 is connected in series with conductor 354, all having the polarities shown.

In the operation of three-phase regulator arrangement 350, switching arrangement 25 can connect terminal 370 to conductor 352, to conductor 354, or to a voltage midway between the voltage on these two conductors. Switching arrangement 25′ can cannot terminal 371 to conductor 354 or to conductor 353, or to a voltage midway between the voltage on these two conductors. Switching arrangement 25″ can connect terminal 372 to conductor 353, to conductor 352, or to a voltage midway between the potential of these two conductors. For maximum boost, terminal 370 is connected to conductor 352, terminal 372 is connected to conductor 353, and terminal 371 is connected to conductor 354. For maximum buck, terminal 370 is connected to conductor 354, terminal 372 is connected to conductor 352, and terminal 371 is connected to conductor 353. With this arrangement in maximum boost, the voltage added to terminal A of the source potential is the voltage across transformer winding 367, which has a phase equal to A–C. With maximum buck, the voltage which is subtracted from terminal A is the voltage across transformer winding 367, which has a phase B–A. The phase angle between maximum boost and maximum buck, is thus 120 degrees, instead of the 180 degrees which was obtainable in the single-phase circuit using the autotransformer shown in FIG. 12.

Figure 17:
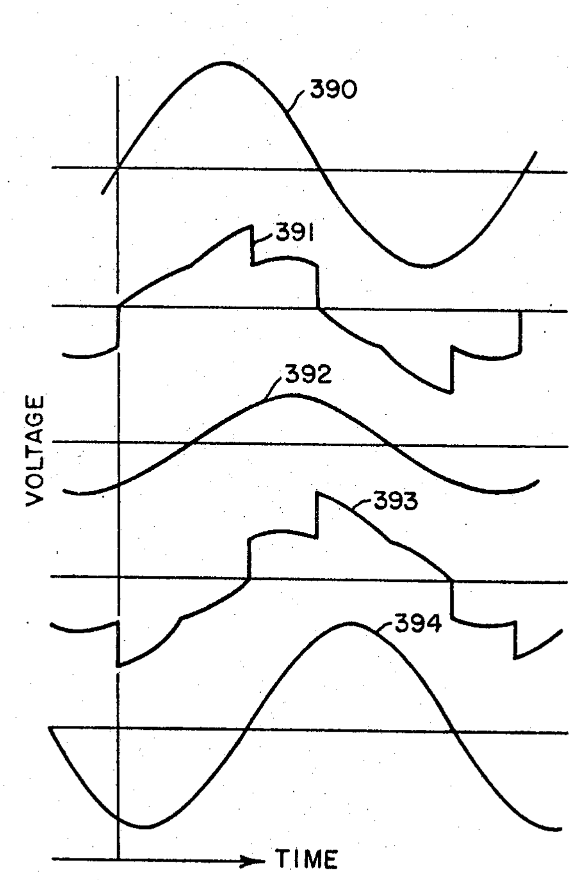
FIG. 17 is a chart which illustrates certain voltage wave forms which aid in the understanding of the three-phase regulator system shown in FIG. 15.
Figure 16:
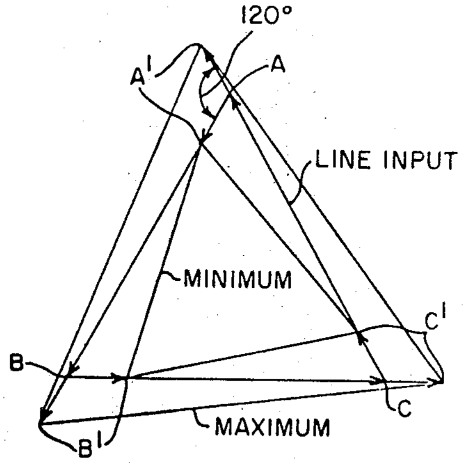
FIG. 16 is a vector diagram illustrating the regulating range of the regulator system shown in FIG. 15.

In like manner, transformer winding 359 modifies the voltage of terminal B of source 351, with a voltage having a phase B–A being added thereto during maximum boost, and a voltage having a phase C–B being subtracted therefrom during maximum buck. Transformer winding 363 modifies the voltage of terminal C, with a voltage having a phase C–B being added thereto during maximum boost, and with a voltage having a phase A–C being subtracted therefrom during maximum buck. This relationship is expressed in the vector diagram of FIG. 16. It will be noted from FIG. 16 that with the secondary windings connected as shown in FIG. 15, the voltage added is in phase with the phase voltages of the source, but the subtracted voltage is not. Therefore, with this arrangement, the voltage can be boosted more than it can be bucked. By reversing the dotted ends of the windings 367, 363 and 359, the vectors at each phase terminal may be reversed in direction, which will then allow more buck than boost. By connecting the secondary windings of the delta connected transformers 355, 356 and 357 in other line conductors, still other regulating modes may be obtained, with one of such modes providing an equal amount of buck and boost. It will be understood that the voltages developed across the secondary windings of the delta or cross connected transformers 355, 356 and 357 may be used in other applications than that shown of boosting and bucking the three-phase source potential. FIG. 17 is a graph which illustrates the waveforms of the voltages across the secondary winding of one of the delta connected transformers, such as across winding 357. Curve 390 shows full boost, curve 391 shows half boost, curve 392 shows minimum developed voltage, curve 393 shows half buck, and curve 394 shows full buck.

Figure 18:
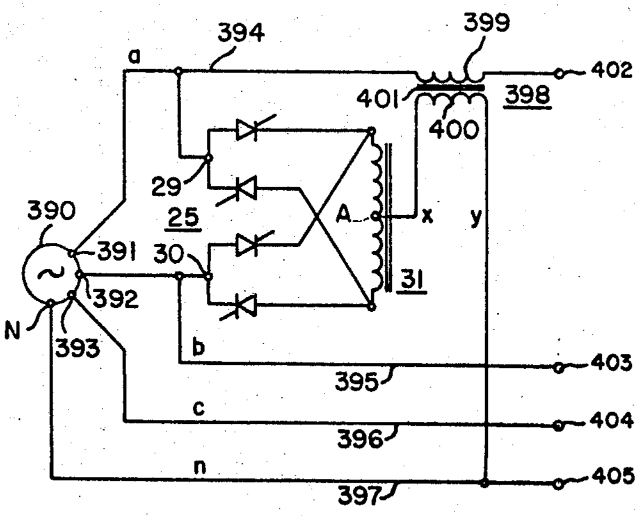
FIG. 18 is a schematic diagram which illustrates another three-phase embodiment of the regulator system.

If it is desirable to use a single basic regulator switching arrangement 25 in a three-phase system, without using an auxiliary center-tapped autotransformer, this may be accomplished as shown in FIG. 18, in those instances where the three-phase supply includes a neutral. The neutral line may thus be used as a reference voltage. In the arrangement shown in FIG. 15, both ends of the secondary winding of each cross connected transformer were moved from one line conductor to another, from full boost to full buck, resulting in a 120 degree phase shift. In FIG. 18, only one end of the transformer winding is moved from one line conductor to another from full boost to full buck, but a phase shift of 120 degrees is still achieved.

More specifically, basic regulator switching arrangement 25 is connected across two line conductors of a three-phase source 390 of alternating potential, which has output terminals 391, 392 and 393, and a neutral terminal N, connected to conductors 394, 395, 396 and 397, respectively. The basic regulator switching arrangement 25 may be connected between any two line conductors, such as line conductors 394 and 395. A two winding transformer 398 having windings 399 and 400 disposed on a magnetic core 401, has its winding 399 connected in line conductor 394, and winding 400 is connected from the midtap terminal A of inductive means 31 to the conductor 397 connected to the neutral terminal N.

Figure 19:
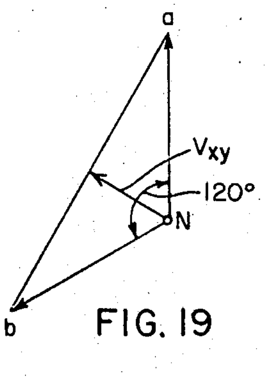
FIG. 19 is a vector diagram illustrating the voltage across the series transformer shown in FIG. 18.
Figure 20:
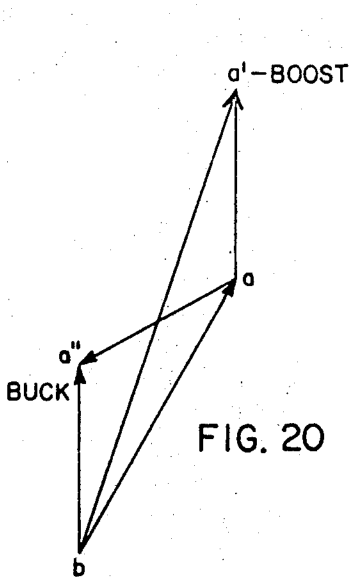
FIG. 20 is a vector diagram which illustrates the regulating range of the regulator system shown in FIG. 18.

FIGS. 19 and 20 are vector diagrams which explain the operation of the embodiment shown in FIG. 18. Line conductors 394, 395, 396 and 397 have been labeled *a*, *b*, *c* and *n* to aid in referring to the voltages between these conductors. As shown in the vector diagram of FIG. 19, the voltage $V_{XY}$ across winding 400 of transformer 398 will vary from voltage $V_{an}$ when midtap terminal A of inductive means 31 is connected to the *a* conductor, to voltage $V_{bn}$ when the midtap A of inductive means 31 is connected to the *b* conductor. With winding 399 of transformer 398 connected in the *a* conductor, the voltage $V_{ab}$ between the *a* and *b* conductors may be varied from voltage $V_{a'b}$ at maximum boost, to voltage $V_{a''b}$ at maximum buck.

FIG. 20 is a vector diagram of the output voltage between conductors *a* and *b* of FIG. 18, with vectors *ba*, *ba'*, and *ba''* indicating norminal, maximum boost, and maximum buck, respectively.

Instead of using a neutral as a voltage reference, the other line conductor 396 could be used as the voltage reference. This would provide an angle of 60 degrees between maximum boost and maximum buck.

In summary, there has been disclosed a new and improved alternating current voltage regulator apparatus using static switching devices. Although the static switching devices have been referred to as being of the solid state type throughout this specification, it will be obvious that any switching device may be used in the basic regulator switching arrangement, which has the required switching speed.

The disclosed regulator apparatus provides switching pulses in response to two circuit parameters, it discloses new and improved three-phase regulator arrangements, and it teaches new and improved regulator systems for regulating RMS voltages by detecting mean voltages, even while the voltage from factor changes.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. A voltage regulator apparatus for an alternating current system comprising:

a source of alternating potential, a load circuit, a static switching circuit, said static switching circuit including first and second input terminals connected to said source of alternating potential, inductive means having first and second terminals and a center tap, first, second, third and fourth static switching means each having an anode, cathode and control electrode, the anode and cathode electrodes of said first and second switching means, respectively, being connected to said first input terminal, the cathode and anode electrodes of said first and second switching means, respectively, being connected to the first and second terminals, respectively, of said inductive means. the anode and cathode electrodes of said third and fourth switching means, respectively, being connected to said second input terminal, the cathode and anode electrodes of said third and fourth switching means, respectively, being connected to the first and second terminals, respectively, of said inductive means, said load circuit being connected in circuit relation with the center tap on said inductive means and said source of potential, first means providing a first signal responsive to the magnitude of the voltage across said load circuit, second means providing a second signal responsive to the magnitude of the circulating current flowing between the first and second terminals of said inductive means, and firing means connected to said first and second means and to said static switching means, for switching said static switching means to regulate the load voltage, and to maintain the magnitude of the circulating current in said inductance means above a predetermined minimum magnitude, said first means switching two of said static switching means each voltage half cycle, said firing means including a differential amplifier having first and second output voltages, and first and second pulse producing means, each of which provide a switching pulse each voltage half cycle, the locations of the switching pulses in each voltage half cycle provided by first and second pulse producing means being responsive to the magnitude of said first and second output voltages, respectively, with changes in the magnitude of said first signal changing the magnitude of said first and second output voltages in opposite directions, and changes in the magnitude of said second signal changing the magnitude of said first and second output voltages in the same direction.

2. The voltage regulator apparatus of claim 1 wherein said inductive means includes an additional winding connected to said second means through rectifier means, adding the signal provided by said additional winding to said second signal, to provide open loop compensation for said second signal.

3. The voltage regulator apparatus of claim 1 wherein said firing means includes reset means for resetting said first and second pulse producing means each voltage half cycle.

4. The voltage regulator apparatus of claim 3 wherein said differential amplifier includes first and second transistors having their emitter electrodes connected in common through impedance means, and their collector electrodes connected in common through impedance means, said reference and first signals being applied to the base electrodes of said first and second transistors, respectively, and said second signal being applied to the commonly connected emitter electrodes.

5. The voltage regulator apparatus of claim 3 wherein said first and second pulse producing means includes means providing first and second ramp voltages, respectively, and first and second threshold means, said pulse producing means providing first and second switching pulses each voltage half cycle when said first and second ramp voltages reach the threshold values of said first and second threshold means, respectively, the first and second output voltages of said differential amplifier modifying the times when said first and second ramp voltages reach the threshold values of said first and second threshold means, respectively.

6. The voltage regulator apparatus of claim 5 wherein the first and second output voltages of said differential amplifier modify the times when said first and second ramp voltages reach the threshold values of said first and second threshold means, respectively, by adding said first and second output voltages to said first and second ramp voltages, respectively.

7. The voltage regulator apparatus of claim 5 wherein said means providing said first and second ramp voltages are first and second R–C circuits, respectively, each having resistance and capacitance means, with said reset means resetting said capacitance means at the end of each voltage half cycle.

8. The voltage regulator apparatus of claim 7 wherein the first and second output voltages charge the capacitance means of said first and second R–C circuits, respectively, each time said first and second R-C circuits are reset by said reset means, to start the first and second ramp voltages at the values of said first and second output voltages respectively.

9. The voltage regulator apparatus of claim 5 wherein said means providing said first and second ramp voltages include three R–C circuits each having resistance and capacitance means, the capacitance of said first and second R–C circuits being charged by said first and second output voltages, respectively, and the capacitance of both of said first and second R–C circuits being charged by the ramp voltage provided by said third R–C circuit, to provide said first and second ramp voltages.

10. An alternating current electrical system comprising:

a source of alternating potential,
an alternating current load circuit,
a mean voltage detector providing a signal responsive to the mean voltage across said load circuit,
a voltage regulator system connected to said source of alternating potential, to said mean detector, and to said load circuit,
said voltage regulator system changing the form factor of the voltage waveform applied to said load circuit as the RMS magnitude of the source of alternating potential changes,
said voltage regulator system changing the mean load voltage as the RMS magnitude of the source of alternating potential changes, the magnitude of the slope of the curve generated by the mean load voltage versus the RMS input voltage being substantially the same as the magnitude of the slope of the curve generated by the form factor versus the RMS input voltage, but of opposite sign, providing a substantially constant product of the form factor and mean load voltage over the regulated range of the regulator, to maintain the RMS value of the load voltage substantially constant.

11. Regulator apparatus for regulating the RMS value of an alternating potential while detecting its mean value, comprising:

a source of alternating potential,
a load circuit,
voltage regulator means connected between said source of alternating potential and said load circuit,
detector means connected between said load circuit and said voltage regulator means, providing a signal responsive to the mean value of the AC voltage applied to said load circuit,
said voltage regulator means changing the form factor of the AC voltage applied to said load circuit as the RMS value of the source of AC potential changes,
said voltage regulator means changing the value of the mean load voltage as the RMS magnitude of the source of AC voltage changes, at a rate which provides a substantially constant product of the form factor and mean load voltage, to maintain the RMS value of the load voltage substantially constant.

12. A three-phase regulator system comprising:

a source of three-phase alternating potential,
first, second, and third transformers each having first and second windings, the first windings of said first, second and third transformers being connected together in a delta configuration having first, second and third terminals,
first, second and third static switching circuits each having first and second input terminals, inductive means having first and second terminals and a center tap, first, second, third and fourth static switching means each having an anode, cathode and control electrode, the anode and cathode electrode of said first and second switching means, respectively, being connected to said first input terminal, the cathode and anode electrodes of said first and second switching means, respectively, being connected to the first and second terminals, respectively, of said inductive means, the anode and cathode electrodes of said third and fourth switching means, respectively, being connected to said second input terminal, and the cathode and anode electrodes of said third and fourth switching means, respectively, being connected to the first and second terminals, respectively, of said inductive means,
means connecting the center taps of the inductive means of said first, second and third static switching circuits to the first, second and third terminals, respectively, of the delta connected first windings of said first, second and third transformers,
means connecting the second and first terminals of said first and second static switching circuits, respectively, to one of the phases of said three-phase source of potential,
means connecting the second and first terminals of said second and third static switching circuits, respectively, to another of the phases of said three-phase source of potential,
means connecting the second and first terminals of said third and first static switching circuits, respectively, to the third of the phases of said three-phase source of potential, and
firing means for switching the static switching means of said first, second and third static switching circuits in response to predetermined circuit parameters, to provide voltages in the second windings of said first, second and third transformers having a magnitude and phase responsive to said circuit parameters.

13. The three-phase regulator system of claim 12 including a three-phase load circuit, the second windings of said first, second and third transformers each being serially connected between a different phase of said three-phase source of alternating potential and said load circuit, and means for providing a signal responsive to the magnitude of the three-phase voltage across said load circuit, said means being connected to said firing means to regulate the magnitude of the load voltage.

14. A regulator system comprising a source of three-phase potential having a plurality of output conductors, a transformer having first and second windings, with its first winding being connected in series with one of the plurality of output conductors,
a static switching circuit having first and second input terminals, inductive means having first and second terminals and a center tap, first, second, third and fourth static switching means each having an anode, cathode and control electrode, the anode and cathode electrodes of said first and second switching means, respectively, being connected to said first input terminal, the cathode and anode electrodes of said first and second switching means, respectively, being connected to the first and second terminals, respectively, of said inductive means, the anode and cathode electrodes of said third and fourth switching means, respectively, being connected to said second input terminal, and the cathode and anode electrodes of said third and fourth switching means, respectively, being connected to the first and second terminals, respectively, of said inductive means,
said static switching circuit having its input terminals connected between two of the plurality of output conductors of said source of three-phase potential, the second winding of said transformer being connected from another of the output conductors of said source of three-phase potential to the center tap on said inductive means, and firing means for switching the static switching means in response to predetermined circuit parameters.

15. The regulator system of claim 14 wherein said source of three-phase alternating potential has three output conductors, with the input terminals of said static switching circuit being connected between two of the output conductors, and the second winding of said transformer being connected between the center tap of said inductive means and third of said output conductors.

16. The regulator system of claim 14 wherein said source of three-phase alternating potential has three output conductors and a neutral conductor, with the input terminals of said static switching circuit being connected between two of the output conductors, and the second winding of said transformer being connected between the center tap of said inductive means and said neutral conductor.

References Cited

UNITED STATES PATENTS

| | | | |
|---|---|---|---|
| 3,408,558 | 10/1968 | Peterson et al. | 323—22 |
| 3,435,331 | 3/1969 | Bixby | 323—24 |
| 3,443,204 | 5/1969 | Baker | 323—24 |

J. D. MILLER, Primary Examiner

W. H. BEHA, Jr., Assistant Examiner

U.S. Cl. X.R.

323—24, 43.5, 47